United States Patent
Cedarleaf-Pavy et al.

(10) Patent No.: US 12,070,854 B2
(45) Date of Patent: Aug. 27, 2024

(54) REPOSITIONABLE ROBOT RISER

(71) Applicant: Dexterity, Inc., Redwood City, CA (US)

(72) Inventors: Jordan Cedarleaf-Pavy, Mountain View, CA (US); Austen Poteet, San Francisco, CA (US); Timothy Ryan, San Francisco, CA (US); Adam Kell, Millbrae, CA (US); Robert Holmberg, Mountain View, CA (US); Salvador Perez, Jersey City, NJ (US); Devon Weinberger, Mountain View, CA (US)

(73) Assignee: Dexterity, Inc., Redwood City, CA (US)

( * ) Notice: Subject to any disclaimer, the term of this patent is extended or adjusted under 35 U.S.C. 154(b) by 46 days.

(21) Appl. No.: 17/716,396

(22) Filed: Apr. 8, 2022

(65) Prior Publication Data

US 2022/0331946 A1    Oct. 20, 2022

Related U.S. Application Data

(60) Provisional application No. 63/175,794, filed on Apr. 16, 2021.

(51) Int. Cl.
*B25J 5/02* (2006.01)
*B25J 9/00* (2006.01)

(52) U.S. Cl.
CPC .............. *B25J 5/02* (2013.01); *B25J 9/0009* (2013.01)

(58) Field of Classification Search
CPC ....................................................... B25J 5/02
USPC .......................................................... 74/89.32
See application file for complete search history.

(56) References Cited

U.S. PATENT DOCUMENTS

| 267,341 | A | * | 11/1882 | Godley | ..................... B61F 5/06 |
|---|---|---|---|---|---|
| | | | | | 213/40 R |
| 4,191,366 | A | * | 3/1980 | Rabin | ..................... B23Q 3/103 |
| | | | | | 269/900 |
| 5,040,767 | A | * | 8/1991 | Ohtomi | ...................... B25J 5/02 |
| | | | | | 248/500 |
| 6,257,821 | B1 | | 7/2001 | Ward | |
| 10,016,890 | B2 | * | 7/2018 | Ochiishi | .............. H02G 11/006 |
| 10,279,471 | B2 | * | 5/2019 | Bartsch | ...................... B25J 5/02 |

(Continued)

FOREIGN PATENT DOCUMENTS

| CN | 104742109 | 7/2015 |
|---|---|---|
| CN | 104842339 | 8/2015 |

(Continued)

*Primary Examiner* — Gerald McClain
(74) *Attorney, Agent, or Firm* — Van Pelt, Yi & James LLP

(57) ABSTRACT

A repositionable riser is provided. The repositionable riser may be used in connection with a robotic arm deployed in a workspace. The repositionable riser includes a riser having one or more mounting locations at or near an upper end of the riser configured to fixedly mount an equipment on the riser, a lateral translation subsystem comprising a carriage on which the riser is mounted and a set of one or more elongated structures that define a constrained lateral path along which the carriage is movable, the path including a first end associated with active use of the equipment and a second end not associated with active use of the equipment, and an anchor structure to which one or both of the carriage and the riser are configured to be coupled to secure the riser at the first end.

21 Claims, 20 Drawing Sheets

(56) References Cited

U.S. PATENT DOCUMENTS

| | | | |
|---|---|---|---|
| 2009/0223165 A1* | 9/2009 | Griffin, Jr. | E04G 21/185 52/703 |
| 2015/0183117 A1* | 7/2015 | Oda | B25J 18/02 414/751.1 |
| 2019/0047138 A1 | 2/2019 | Doll | |
| 2020/0001457 A1 | 1/2020 | Limone | |
| 2020/0338759 A1* | 10/2020 | Satou | B25J 5/02 |

FOREIGN PATENT DOCUMENTS

| | | | |
|---|---|---|---|
| CN | 207309931 | | 5/2018 |
| CN | 207309931 U | * | 5/2018 |
| CN | 111844129 | | 10/2020 |
| CN | 112647869 | | 4/2021 |
| WO | 2015071483 | | 5/2015 |

\* cited by examiner

REPOSITIONABLE ROBOT RISER

CROSS REFERENCE TO OTHER APPLICATIONS

This application claims priority to U.S. Provisional Patent Application No. 63/175,794 entitled REPOSITIONABLE ROBOT RISER filed Apr. 16, 2021 which is incorporated herein by reference for all purposes.

BACKGROUND OF THE INVENTION

Shipping and distribution centers, warehouses, shipping docks, air freight terminals, big box stores, and other activities that ship and receive various types of items (e.g., homogenous or non-homogeneous sets of items) use strategies such as packing and unpacking dissimilar items in boxes, crates, containers, conveyor belts, and on pallets, etc. The items may be sorted for routing to corresponding delivery destinations, items may be packed in boxes, crates, on pallets, etc. enables the resulting sets of items to be handled by heavy lifting equipment, such as forklifts, cranes, etc., and enables items to be packed more efficiently for storage (e.g., in a warehouse) and/or shipment (e.g., in truck, cargo hold, etc.).

Currently, items are sorted or packed/unpacked by hand. Human workers select items to be sorted or stacked (e.g., based on a shipping invoice or manifest, etc.), and use human judgment and intuition to pick items from a first location and move the item to a second location such as a segmented conveyor, a box, a pallet, etc. However, in some cases, items simply arrive too quickly and chutes or conveyors delivering the items may become jammed if a human operator is not able to pick and place the items sufficiently fast, or items that arrive such as via conveyor or other mechanism and/or are selected from bins in an order listed, etc., resulting in an unstable palletized or otherwise packed set.

Use of robotics is made more challenging in many environments due to the variety of items, variations the order, number, and mix of items to be packed, on a given pallet for example, and a variety of types and location of container and/or feed mechanism from which items must be picked up to be placed at a certain location. In addition, such variations in items, order of items, number of items, and mix of types of items may lead to instability of a stack of items on a pallet.

BRIEF DESCRIPTION OF THE DRAWINGS

Various embodiments of the invention are disclosed in the following detailed description and the accompanying drawings.

DETAILED DESCRIPTION

Figure 1A:
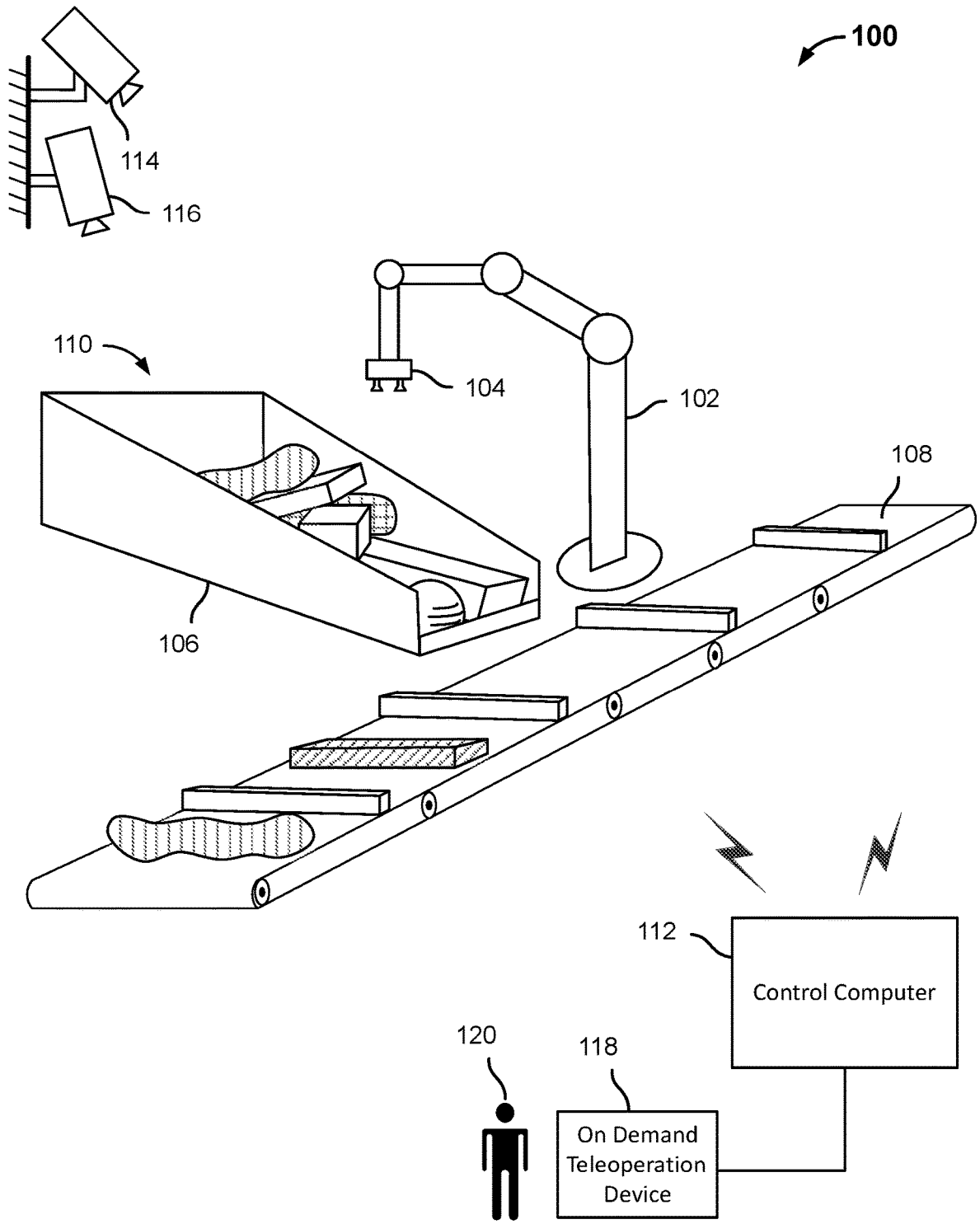
FIG. 1A is a diagram illustrating an embodiment of a robotic system to move one or more items.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, "pallet" includes a platform, receptacle, or other container on, or in, which one or more items may be stacked or placed. Further, as used herein, the pallet may be used in connection with packaging and distributing a set of one or more items. As an example, the term pallet includes the typical flat transport structure that supports items and that is movable via a forklift, a pallet jack, a crane, etc. A pallet, as used herein, may be constructed of various metals including, wood, metals, metal alloys, polymers, etc.

As used herein, palletization of an item or a set of items includes picking an item from a source location, such as a conveyance structure, and placing the item on a pallet such as on a stack of items on the pallet.

As used herein, depalletization includes picking an item from a pallet, such as from a stack of items on the pallet, moving the item, and placing the item at a destination location such as a conveyance structure.

As used herein, singulation of an item includes picking an item from a source pile/flow and placing the item on a conveyance structure (e.g., a segmented conveyor or similar conveyance). Optionally, singulation may include sortation of the various items on the conveyance structure such as via singly placing the items from the source pile/flow into a slot or tray on the conveyor.

As used herein, kitting includes the picking of one or more items/objects from corresponding locations and placing the one or more items in a predetermined location in a manner that a set of the one or more items correspond to a kit.

As used herein, a first end of a riser or riser system corresponds to a position at which the equipment mounted to the riser may be deployed and operated. For example, the first end corresponds to an active position at which a robot mounted to the riser is operable to pick items from a source location and move the locations to a destination location.

As used herein, a second end of a riser or riser system corresponds to a position at which the equipment mounted to the riser may be deployed and placed in an inactive position (e.g., the equipment may not be operable as least in so far as compared to normal operation when the equipment is in the active position such as at the first end). As an example, the second end may correspond to an in active position at which a robot mounted to the riser may move or vibrate in response to dynamic forces generated by operation of the robot.

Robotic systems deployed to perform singulation, kitting, palletization, and/or depalletization generally require a robust base that does not move as the robot arm moves an end effector thereof to an item, picks up the item, moves the item to a destination location, and places the item at the destination location. According to related art, a robot is securely anchored to a base that can withstand forces produced by operation of the robot. The base is generally bolted to a floor, such as a floor of a warehouse in which the robotic system is deployed. Accordingly, the base may be secure, however, the base is immovable (e.g., without significant human operator effort to detach/remove the base from the workspace location in the warehouse in which the robotic system is deployed. The base on which a robotic arm of a robotic system is mounted is often referred to herein as a riser.

Various embodiments provide a riser, on which equipment such as a robot is to be mounted, that is repositionable between at least an inactive position for the equipment and an active position for the equipment. The riser may be moved between the inactive position and the active position with relative ease and minimal effort. In contrast to other risers that are effectively permanently mounted to a fixed position such as a floor of a warehouse, the riser that is repositionable may be moved quickly between the inactive position and the active position in response to a temporary coupling/decoupling of the riser at the first end and/or second end. According to various embodiments, a riser system may include a base that is effectively permanently mounted to a fixed position such as a floor of a warehouse similar to risers in other systems, however, according to various embodiments the riser remains repositionable between the inactive position and the active position (e.g., the base remains fixed while the riser is repositionable).

In various embodiments, a fallback riser (e.g., a repositionable riser) as disclosed herein may be used in connection with any robotic installation in which it may be necessary or convenient to be able to move a robotic manipulator, such as a robotic arm, to a different position, e.g., to enable a human worker to gain access to work in the workspace in which the robot had been working.

For example, in some embodiments, a fallback riser as disclosed herein is used to mount a robotic arm to perform robotic singulation, in a first mode of operation, and to move the robotic arm out of the way, in a second mode of operation, e.g., to provide access for a human worker to perform a task, such as to clear a jam, continue singulation by hand while the robot is being repaired, etc. An example of a robotic singulation system in which a fallback riser as disclosed herein may be used is described in U.S. patent application Ser. No. 16/916,605, filed Jun. 30, 2020, now U.S. Pat. No. 10,906,188, issued Feb. 2, 2021, which are hereby incorporated in by reference in their entireties.

A riser system is disclosed herein that comprises a riser that is repositionable. According to various embodiments, a repositionable riser is provided. The repositionable riser may comprise a riser having one or more mounting locations at or near an upper end of the riser configured to fixedly mount an equipment on the riser, a lateral translation subsystem comprising a carriage on which the riser is mounted and a set of one or more elongated structures that define a constrained lateral path along which the carriage is movable, the path including a first end associated with active use of the equipment and a second end not associated with active use of the equipment, and an anchor structure to which one or both of the carriage and the riser are configured to be coupled to secure the riser at the first end. In some embodiments, the equipment includes a robot. The comprises a six-axis robotic arm.

According to various embodiments, a riser is provided. The riser may support a robot (e.g., as the robot is operating, resting, etc.). The robot may be 6-axis robotic arm. Various other robotic arms may be implemented. The riser may securely anchor the robot within the workspace of the robotic system. For example, the riser does not move during operation of the robot. As a robot arm operates, various dynamic forces may be generated as a result of the movement of the robotic arm and/or item being moved by the robotic arm. The dynamic forces may act on the riser. A robust riser may prevent the robot from moving as dynamic forces are acting on the riser. If the robot were to move as a result of the dynamic forces or other conditions, then the robot and/or the sensors within the workspace may become miscalibrated, which may cause the robot to err in placing items at intended destination locations, etc.

According to various embodiments, a repositionable riser, or riser system, is provided. The repositionable riser may comprise a riser to which a robot is fixedly mounted. For example, the robot may be fixedly mounted to the riser at one or more mounting locations comprised in the riser. In some implementations, the one or more mounting locations comprise a mounting plate. As an example, the mounting plate may comprise one or more threaded holes to which the robot (e.g., equipment) may be mounted. As another example, the mounting plate may comprise one or more through holes with which the robot may be mounted (e.g., bolted) to the riser.

According to various embodiments, the repositionable riser is configured to support a riser that may be moved in a plurality of positions. The plurality of positions may include a first end (e.g., an active position) and a second end (e.g., an inactive position). The first end and the second end may be connected via one or more structures that define a lateral path. The robot (e.g., the riser and the robot mounted thereon) may be moved between the first end and the second end along the lateral path. Examples of the one or more structures include one or more rails, one or more guides, one or more channels, etc. Various other types of structures may be implemented to provide a secure/defined path along which the robot may be moved. The riser may be mounted on a carriage that traverses between the first end and the second end on or in the one or more structures. The riser/robot may be manually moved between the first end and the second end by a human operator. For example, one or both of the riser and the robot may include a handle with which the human operator may easily grasp the riser/robot to move the robot to the active position or the inactive position. The carriage may comprise one or more low friction rail bearings that slide along the one or more structures (e.g., one or more rails).

According to various embodiments, the repositionable riser is configured to support a riser that may be moved in a plurality of positions. The repositionable riser may support to selectively hold the riser in at least an active position (e.g., in which a robot mounted to the riser is operable), and an inactive position (e.g., in which the robot may not be operable). In some embodiments, the repositionable riser comprises at least one anchor structure that may be coupled to the riser. The anchor structure may be disposed on at least one of the first end or the second end of the repositionable riser. In some embodiments, an anchor structure disposed at the first end of the repositionable riser (e.g., the active position) is configured to securely hold the robot in place such as in a manner that prevents the robot from moving during operation. The anchor structure disposed at the first end may be coupled to the riser and/or a carriage on which the riser is mounted (e.g., to traverse between the first end and the second end). In some embodiments, the carriage and/or the riser may be decoupled relatively easily from the anchor structure at the first end (e.g., and the riser/carriage may be moved to the second end).

According to various embodiments, the anchor structure at the first end may comprise one or more holes via which the carriage and/or the riser are bolted (e.g., coupled) to the anchor structure. The one or more holes via which the carriage and/or the riser are bolted may comprise one or more threaded holes. As an example, a tightening of a bolt inserted into at least one of the one or more threaded holes causes the riser to engage at least one of the one or more anchor blocks (e.g., at the first end). As another example, a loosening of one or more bolts inserted into the one or more threaded holes causes the riser to decouple from the one or more anchor blocks, and the riser and/or carriage may be moved to the second end. According to various embodiments, in response to a loosening of one or more bolts inserted into the one or more threaded holes, the riser may disengage from the at least one of the one or more anchor blocks. For example, the carriage may comprise one or more springs that are biased to push the riser away from the one or more anchor blocks. As an example, if the one or more bolts are loosened/removed from the coupling of the riser/carriage to the one or more anchor blocks, the riser is pushed by a spring to rise and provide clearance between the riser/carriage and the one or more anchor blocks. The spring may be biased to exert a force on the riser and/or carriage in a direction that is substantially perpendicular to a top surface of at least one of the one or more anchor blocks. In some embodiments, the one or more bearings comprised in the carriage include at least one spring (e.g., a bearing spring) that is biased to exert a force on the riser (e.g., to disengage the riser/carriage from the one or more anchor blocks. The force, or collective force, that the one or more springs (e.g., bearing springs) exert on the riser/carriage may be sufficient to lift the riser (e.g., the riser with the robot or equipment mounted thereon).

According to various embodiments, the repositionable riser comprises a riser that is fastened or coupled to a carriage that carries the riser (e.g., the riser with the robot or equipment mounted thereon) between the first end and the second end. For example, the riser may be fastened/coupled to one or more bearings comprised in the carriage. In some embodiments, the riser is fastened/coupled to the carriage or one or more bearings in a manner that allows for a limited clearance between the riser and the one or more anchor blocks in the event that the riser is decoupled/disengaged from the one or more anchor blocks (e.g., via the loosening/removal of the bolts used to couple the riser to the one or more anchor blocks). The limited clearance may be a predefined height. Limitation of the clearance may ensure that (i) the riser may freely move across/over the one or more anchor blocks so that the equipment may be relatively freely moved to the second end, and (ii) the riser remains securely mounted to the carriage even when the riser/carriage is not coupled to the one or more anchor blocks. For example, clearance between the one or more anchor blocks and the riser eliminate frictional forces therebetween, thereby permitting the riser (e.g., now supported by the carriage/bearings on the rails or other structures) to be moved with minimal effort.

According to various embodiments, the anchor structure at the first end may comprise one or more cam levers via which the carriage and/or the riser are coupled to the anchor structure (e.g., to one or more anchor blocks). As an example, a tightening of the one or more cam levers causes the riser to engage at least one of the one or more anchor blocks (e.g., at the first end). As another example, a loosening of the one or more cam levers causes the riser to decouple from the one or more anchor blocks, and the riser and/or carriage may be moved to the second end.

According to various embodiments, the repositionable riser comprises a riser that may be selectively coupled to a second end. The coupling of the riser be less accurate and quicker to couple than the coupling of the riser to the one or more anchor blocks at the first end. Because the second end corresponds to a position at which the robot is inactive, the coupling to the second end is not required, for operation of the robot, to be sufficiently robust to prevent movement or vibration of the robot (e.g., from the dynamic forces generated by operation of the robot). The coupling at the second end may not be as robust or rigid against the dynamic forces of an operating robot as the coupling at the first end. In some embodiments, the coupling at the second end comprises a quick release pin that locks the riser in the inactive position. The loosely coupling of the riser at the inactive position may prevent the riser (e.g., robot) from inadvertently moving or traversing along a lateral path between the first end and the second end. In some embodiments, the quick release pin may be inserted into a through-hole included in the riser, and further into a hole in a base of the repositionable riser. As an example, the base may be a base plate.

According to various embodiments, the repositionable riser may include a cover (e.g., a step cover) disposed at the first end. The step cover may provide protection of various components comprised in the repositionable riser in the event that a human operator is present/working at the first end (e.g., while robot is in the inactive position the second end). The step cover may be configured/arranged such that when the step cover is engaged it protects at least one of the one or more anchor blocks, the one or more structures (e.g., the rails, guides, channels, etc. along which the riser/carriage traverses), and/or one or more cables or hoses that connect to the robot to provide the robot with connection to various sources such as power, network communications, and/or fluids (e.g., compressed air for pneumatic control of an element of the robot such as a suction-based end effector). The cover may provide safety protection for the human operator. For example, the cover may prevent a human operator from inadvertently falling or tripping over various components of the repositionable riser. In some cases, a human operator may stand at the first end (e.g., in the active position) to manually perform one or more tasks that the robot would perform at the first end (e.g., to manually perform a singulation, kitting, or palletization/de-palletization). For example, if a plan or strategy being implemented by the robot is unsuccessful and/or the robot is unable to determine a plan or strategy for performing a task (e.g., moving the item), the human operator may be notified, and the human operator may come to the workspace to manually perform the task and/or train the robot. In some cases, a human operator may stand at the first end to remediate the robotic system (e.g., to replace an inoperable or broken end effector, to remove a blockage in the system, etc.). Accordingly, in those cases that the human operator is within the workspace (e.g., at the active position), operator safety is improved with the engagement of the cover.

In some embodiments, a repositionable riser is provided. The repositionable riser may comprise one or more of a riser, a rail system and one or more end stops, a rail locating block, a cable carrier, one or more spring load bearings, a bolt storage, a locating pin in fallback, a safety sensor (e.g., that is configured to detect whether the robot is in the active position), and a step cover (e.g., that covers the rail system, a rail locating block, etc.).

Various embodiments include a riser system/repositionable riser that overcomes one or more of the following challenges (i) the requirement that the riser be deployed/operable for high uptime; (ii) ease of use and ergonomics (e.g., the repositionable riser may be easily repositioned such as by a human operator); (iii) the mechanism (e.g., that enables a riser to be repositionable) satisfies a height limitation; (iv) a transition time that the riser/robot arm may be moved between an inactive position and an active position (e.g., to allow a human operator to operate into the position of the active position of the riser); (v) the riser is sufficiently robust to operate in an industrial environment; (vi) the active position in which the robotic arm is configured to operate in the workspace is repeatable (e.g., the robotic system may be configured specifically for the workspace and thus the deployment of the robot arm in a repeatable active position may reduce reconfigurations, etc.); (vii) maintains stability under dynamic forces of robot arm; (viii) maintains safety of human operators/workers within the workspace of the robotic system as the robot arm is operating or when the riser is moved to an inactive position.

FIG. 1A is a diagram illustrating an embodiment of a robotic system to move one or more items.

In the example shown, system 100 includes a robotic arm 102 equipped with a suction-based end effector 104. While in the example shown the end effector 104 is a suction-based end effector, in various embodiments, one or more other types of end effectors may be used in a singulation system as disclosed herein, including without limitation a pinch-based end effector or other types of actuated grippers. In some embodiments, end effector 104 comprises one or more suction-based ends (e.g., one or more suction cups). In various embodiments, the end effector may be actuated by one or more of suction, air pressure, pneumatics, hydraulics, or other actuation. Robotic arm 102 and end effector 104 are configured to be used to retrieve parcels or other items that arrive via chute or bin 106 and place each item in a corresponding location on segmented conveyor 108. In this example, items are fed into chute 106 from an intake end 110. For example, one or more human and/or robotic workers may feed items into intake end 110 of chute 106, either directly or via a conveyor or other electro-mechanical structure configured to feed items into chute 106.

In the example shown, one or more of robotic arm 102, end effector 104, and conveyor 108 are operated in coordination by control computer 112. In some implementations, control computer 112 is configured to control a plurality of robotic arms operating at one or more workstations. In various embodiments, a robotic singulation as disclosed herein may include one or more sensors from which an environment of the workspace is modeled. In the example shown in FIG. 1A, system 100 includes image sensors, including in this example 3D cameras 114 and 116. In various embodiments, other types of sensors may be used (individually or in combination) in a singulation system as disclosed herein, including a camera, an infrared sensor array, a laser array, a scale, a gyroscope, a current sensor, a voltage sensor, a power sensor, a force sensor, a pressure sensor, a weight sensor, and the like. In various embodiments, control computer 112 includes a workspace environment state system such as a vision system used to discern individual items, debris on the workspace, and each item's orientation based on sensor data such as image data provided by image sensors, including in this example 3D cameras 114 and 116. The workspace environment state system in some embodiments includes sensors in the robotic arm to detect a weight of an item (e.g., a grasped item) or to detect information from which an estimated weight is determined. For example, information pertaining to an amount of current, voltage, and/or power used by one or more motors driving movement of the robotic arm can be used to determine the weight (or an estimated weight) of the item. As another example, the chute includes a weight sensor, and the weight of the item is determined based on a difference of the weight on the chute as measured by the weight sensor before the item is picked up and after the item is picked up. As another example, information pertaining to an output from one or more sensor arrays can be used to determine a location of the item in the workspace, a location of the item while the item is grasped and/or being moved by the robotic arm, and/or a location of the robotic arm (e.g., based on a determination of an output from a subset of sensors of the one or more sensor arrays compared to another subset of sensors of the one or more sensor arrays). As another example, information pertaining to an output from one or more sensor arrays can be used to determine a dimension or size of an item to be singulated and/or another item or object within the workspace.

The workspace environment state system produces output used by the robotic system to determine and implement a plan to autonomously operate a robotic structure to pick one or more items from the workspace and place each in a corresponding available defined location for machine identification and sorting, such as a partitioned section of segmented conveyor 208. In some embodiments, the workspace environment state system produces an output (e.g., sensor data or information otherwise characterizing the workspace and/or items within the workspace) used by the robotic system to detect a state, condition, and/or attribute associated with one or more items in the workspace, and/or a state or condition associated with the robotic arm or other element of the workspace. According to various embodiments, in response to detecting (e.g., determining) the state, condition, and/or attribute associated with one or more items in the workspace, the robotic system implements one or more active measures in connection with singulating an item. The active measure may include updating the plan to autonomously operate a robotic structure to pick one or more items from the workspace and place each item singly in a corresponding location in a singulation conveyance structure. In some embodiments, the active measure or the updating the plan can include operating the robotic structure to change or adapt to the detected state, condition, and/or attribute (e.g., implement a change or manner by which an item is singulated, change a path or trajectory along which the item is singulated, change a manner by which the item is grasped, change a location on the item at which the item is grasped, etc.).

In various embodiments, a robotic system as disclosed herein includes and/or does one or more of the following, e.g., by operation of a control computer such as control computer 112:

Computer vision information is generated by merging data from multiple sensors, including one or more of 2D cameras, 3D (e.g., RGBD) cameras, infrared, and other sensors to generate a three-dimensional view of a workspace that includes one or more sorting stations. The robotic system determines characteristics of items and/or debris or other abnormalities in the three-dimensional view of the workspace.

Robotic system coordinates operation of multiple robots to avoid collisions, getting in each other's way, and contending to pick up the same item and/or place an item in the same destination location (e.g., segmented part of the conveyor) as another robot. The robotic system coordinates operation of a plurality of robots operating within a same workspace to singulate a plurality of items. For example, in various embodiments, the robots operate independently to pick and place items. If a risk of collision is detected, responsive action is taken to ensure the plurality of robots do not collide with one another during singulation.

Robotic system coordinates operation of multiple robots to ensure all items are placed and only one per slot/location. For example, if robot A drops an item, the system tasks robot B to pick it up; item placed but with improper orientation is picked up and adjusted or moved to another location by the same or another robot; two or more items in a single destination slot result in the robot downstream station picking one of the two or more items off the conveyor and placing the item in a new location; etc.

Robotic system continuously updates motion planning for each robot and all of the robots together to achieve a desired collective throughput (e.g., to maximize collective throughput, to attain a predefined threshold of collective throughput, etc.). In response to determining that two or more robots have collided or will collide if moving according to their respective plans for singulation of items, the robotic system implements an active measure to ensure that the two or more robots avoid collision or otherwise reset independent operation of the two or more robots.

In response to a determination that two robots independently are tasked to acquire the same item, the system picks one at random to get that item and the other moves on to the next item (e.g., identify, select, determine grasp strategy, pick, move according to plan, and place).

The robotic system may manage the independent operation of a plurality of robots to ensure that the robots select items at different times to avoid the same item being selected for singulation by two different robots.

The robotic system may analyze all possible robotic arm-objects combinations and attempts to find a suitable pair. If no pair is found, then the best item for a particular robot (e.g., the primary robot) is selected as the item to be singulated by the particular robot. If there is no item for the particular robot (e.g., the particular robot) we default to an item for the secondary bot.

Conveyor movement and/or speed is controlled as needed to avoid empty locations and achieve a desired robot productivity (throughput)

In response to a determination that an item is misplaced or dropped, the system assigns a robot or, if needed, a human worker to pick it up and place it back in the retrieving robot's own source pile or, if available or more optimal, on a next open slot on the conveyor.

Upstream robots are controlled to intentionally leave some slots open for downstream robots to place items on the conveyor.

Downstream robots are controlled to correct errors from an upstream robot placing an item on the conveyor (e.g., to correct the placement of an item that rests in more than one slot/tray, to update a data structure with an association between an identifier for the item with the slot in which the upstream robot placed the item, etc.).

Failure that cannot be corrected by the same or another robot results in an alert to obtain human (or other robotic) intervention to resolve.

In response to a determination that a grip strength (e.g., a pressure attained by the end effector) is abnormal (e.g., less than is expected during normal operation), perform a diagnostic process that includes testing the grip strength on a predefined surface and in connection with determining whether remedial action is necessary with respect to the end effector.

Move/remove the debris within the workspace, or reconfigure an item to be singulated (e.g., to improve the likelihood that the item is successfully picked from the source pile/flow and placed on the conveyance structure).

Control a chute conveyor to reconfigure items within the workspace (e.g., to bring an item selected for singulation closer to a front of the chute for quicker and easier access by the robotic arm, to reposition one or more items to improve the ability of a robotic arm to grasp an item, etc.).

Use sensor data from workspace environment state system (e.g., from one or more sensors within the workspace) to model chute flow (or model the workspace environment), detect a deviation from an expected chute flow (or from an expected workspace environment), use the sensor data to detect a clog or abnormality within the chute flow or workspace environment, and to implement an active measure to clear the clog.

Use sensor data from the workspace environment state system to detect one or more characteristics (e.g., attributes) of the item selected for singulation, determine that grasping or releasing of the item is expected to improve in response to implementation of an active measure, and implement the active measure to improve the grasping or releasing of the item.

Use sensor data to determine that the robotic arm has grasped a plurality of items in connection with singulation of one of the items, and determine a plan for releasing the plurality of items in order to place each item singly in a corresponding location in a singulation conveyance structure (e.g., selecting different locations in the singulation conveyance structure at which the corresponding items are to be placed, and/or determine a strategy for operating the end effector to release a first subset of the plurality of items at a different time from a second subset of the plurality of items).

Select a slot on the conveyance structure in which to place a selected item based on a size of the selected item and/or one or more characteristics of an item within a slot on the conveyance structure. For example, a slot is chosen to ensure that the selected item is not placed in a slot that is adjacent to a slot comprising a tall or large item.

Select a path for singulating an item on the conveyance structure based on an attribute of the item (e.g., a size of the selected item, a weight of the item, etc.) and/or one or more attributes (e.g., characteristics) of an item within a slot on the conveyance structure. For example, a path is determined to place the item in a slot that is adjacent to a slot comprising a tall or large item.

Determine a movement and speed of the robotic arm that singulates an item based at least in part on a speed of a conveyor belt.

Determine a trajectory of the item to be singulated based at least in part on one or more of a characteristic of the item, a characteristic of the workspace environment, and/or a characteristic of the conveyance structure (e.g., a speed of the conveyor belt).

Determine a probability of successful singulation corresponding to one or more paths/trajectories of an item to be singulated, and select a path/trajectory along which the item is to be singulated based on the corresponding probability of success.

Determine a positioning of a robot arm and/or an end effector of the robot arm to obtain a successful grasp (e.g., as determined based on a probability of grasp success, a type of packaging of the item, a dimension of the item, an expected grip strength in relation to a threshold value, etc.). The positioning of the end effector can include controlling the robot arm or a wrist of the robot arm to move in order for the end effector to be orthogonal to a surface of the item.

Update the ability of the robotic system to detect an empty slot or tray. For example, the definition of an empty slot/tray used by the robotic system to identify an empty slot/tray is updated over time.

Determine a plan for moving the item based at least in part on a cost function associated with moving the item. For example, the computer system may determine to optimize or choose a best or a good enough plan (e.g., a plan that satisfies one or more minimum requirements/thresholds) such as a path/trajectory along which to move the item. The cost function may include various factors such as time to move the item, effort/work to move the item (e.g., a height that the robot is to lift the item), a stability of the item during movement and/or after placement, a determination that a plan/path is not expected to result in a collision with another object in the workspace, etc.

In various embodiments, an arbitrary mix of items to be singulated may include parcels, packages, and/or letters of a variety of shapes and sizes. Some items may be standard packages, one or more attributes of which may be known, others may be unknown. Sensor data such as image data is used, in various embodiments, to discern individual items (e.g., via image segmentation). The boundaries of partially occluded items may be estimated, e.g., by recognizing an item as a standard or known type and/or extending visible item boundaries to logical estimated extents (e.g., two edges extrapolated to meet at an occluded corner). In some embodiments, a degree of overlap (i.e., occlusion by other items) is estimated for each item, and the degree of overlap is taken into consideration in selecting a next item to attempt to grasp. For example, for each item a score may be computed to estimate the probability of grasp success, and in some embodiments the score is determined at least in part by the degree of overlap/occlusion by other items. Less occluded items may be more likely to be selected, for example, other considerations being equal.

If a source pile/flow has an arbitrary mix of items to be singulated, the source pile/flow generally includes items that have different types of packaging, such as a cardboard box packaging, a paper envelope packaging, a polybag packaging (e.g., polyethylene bags), etc. The robotic system can determine the packaging of an item based on vision data obtained from the sensors or based on a pressure attained between the end effector and the item when the robotic arm attempts to pick up the item. The sensor data can be used to discern a type of packaging corresponding to a particular item in the source pile/flow. In some embodiments, the robotic system determines a strategy for grasping the item based at least in part on the type of packaging corresponding to the item. For example, relatively heavier items packaged in a polybag will generally experience "tenting" between end effector suction cups. Tenting can cause sub-optimal suction from the end effector of the robotic arm, and thus the grasping of such an item is sub-optimal. According to various embodiments, in response to determining that the item is relatively heavy (e.g., that the weight exceeds a predefined threshold) and that the item is packaged in a polybag, or in response to determining that tenting is being caused while grasping the item, the robotic structure performs an active measure to change or adapt to the "tenting" or to the determination of the type the packaging of the item. As an example, the robotic structure performs an active measure to partially lift the package and drag the package from the chute to the corresponding slot in the conveyance structure.

The robotic system may determine a path or trajectory (or a trajectory of the robotic arm/end effector in approaching the item for grasp) based on a type of packaging of the item in order to avoid tenting or to otherwise improve a grasping of the item. As an example, the robotic arm (e.g., a wrist) and/or the end effector is controlled to be orthogonal to a surface of the item from which the item is grasped. As another example, the path or trajectory of the robotic arm and/or end effector can be determined to knock an item over or otherwise reposition the item before grasping the item.

In various embodiments, multiple 3D and/or other cameras may be used to generate image data. A 3D view of the scene may be generated, and/or in some embodiments a combination of cameras is used to look at the scene from different angles and the camera that is least occluded, e.g., with respect to a workspace and/or one or more specific items in the workspace, is selected and used in connection with the grasping and moving of the one or more items. The image data can be used to detect debris on the chute or within the workspace, a clog in the chute flow of items through the workspace, a number of items grasped by the robotic structure during singulation of a selected item, a characteristic of one or more items occupying slots on the conveyance structure, etc. In some embodiments, the image data is used to determine a characteristic (e.g., an attribute) of one or more items in the workspace. As an example, the image data can be used in connection with determining (e.g., estimating) a height or dimension of an item.

The multiple cameras serve many purposes, in various embodiments. First, they provide a richer full 3D view into the scene. Next, they operate in cohesion to minimize the errors due to package shininess when light reflecting off a package and into a camera may disrupt its operation; in this case another camera at a different location provides a backup. In some embodiments, they can be selectively triggered by a predictive vision algorithm that determines which camera has the best viewing angle and/or lowest error rate for picking a particular package so that each package has the optimal camera looking at it. In some embodiments, one or more cameras are mounted on an actuated base, of which the system can change the position and orientation to provide a more optimal perception (e.g., view) of a package. In some embodiments, one or more cameras are mounted on the robotic structure (e.g., on the end effector of the robotic arm, etc.).

Another purpose served by cameras is, in various embodiments, to detect any sort of unforeseen error in robot operation or any disruption to the environment. Cameras placed on the robot and on the environment have different error and accuracy profiles. The cameras on the robot can be more accurate since they are rigidly fixed to the robot but slower to use because use of such cameras requires the robot to slow down or stall. Cameras in the environment have a stable view and are effectively faster because the robot can multi-task and do something else while a camera is taking a photo. But if someone moves or shakes the camera stand, the cameras may become out of sync with the robot and cause errors. In various embodiments, images from robot and non-robot cameras are combined (e.g., occasionally or on a package miss) to detect if the robot is in sync with non-robot cameras. If the cameras are determined to be out of sync, the robot takes corrective action, such as performing a calibration or synchronization process, alerting a human operator, etc. In some embodiments, a camera may not be mounted rigidly on a robotic arm, and in some such embodiments gyros and/or accelerometers on the cameras may be used to filter or compensate for the motion of the mounting base.

According to various embodiments, system 100 may include one or more sensors other than or in addition to a plurality of cameras, such as one or more of an infrared sensor array, a laser array, a scale, a gyroscope, a current sensor, a voltage sensor, a power sensor, and the like. Information received from the various other sensors is used in determining one or more attributes of the item to be singulated and/or attributes of another item or object within the workspace, etc.

Referring to FIG. 1A, in various embodiments, robotic arm 102 is to be driven by one or more motors, e.g., one or more motors at each movable joint or mount location. In some embodiments, the work required to drive robotic arm 102 (e.g., to move the robotic arm as the robotic arm attempts to singulate an item) is indicative of one or more characteristics of the item to be singulated. For example, in some embodiments, a weight of the item may be computed (or estimated) based on the work required to drive the robotic arm 102 while the item is in its grasp. In various embodiments, the work required to drive the robotic arm 102 is measured using a current sensor, a voltage sensor, a power sensor, and/or the like, or some combination thereof. In response to determining the weight of the item during singulation, the robotic system determines a path/trajectory of an item to be singulated based at least in part on the weight of the item. The robotic system may perform an active measure to adapt to the weight of the item such as, for example, updating the path or trajectory in response to determining the weight of the item. In some embodiments, in response to determining that the weight of the item is greater than a predefined threshold, robotic system 100 adjusts the plan to singulate the item via partially picking up the item and dragging the item to the corresponding location on the conveyance structure (e.g., in contrast to wholly picking up the item and moving the arm to place the item on the conveyance structure). In some embodiments, in response to determining the weight of the item, the robotic structure adjusts the speed at which the robotic arm (and the item) is moved. For example, the larger the weight of the item, the greater the shear forces are between the item and end effector 104 as the robotic arm 212 is moved. Further, the shear forces can increase as the speed at which the robotic arm is operated increases (e.g., the speed at which the robotic arm moves the item). Accordingly, robotic system 100 can control the speed of the robotic arm 102 based at least in part on the weight of the item to ensure that the item remains firmly grasped by the robotic arm. Although the description hereof describes the weight being measured based on using a current sensor, a voltage sensor, a power sensor, and/or the like, the weight can also be measured using a force sensor configured in the robotic arm 102 or the end effector 104. However, force sensors are relatively expensive and thus low-level hardware information, such as motor torque or a measure of the work used by the motor is an effective manner by which to determine (e.g., estimate) the weight of the item.

Information pertaining to an output from one or more sensor arrays can be used to determine a location of the item in the workspace, a location of the item while the item is grasped and/or being moved by the robotic arm, and/or a location of the robotic arm (e.g., based on a determination of an output from a subset of sensors of the one or more sensor arrays compared to another subset of sensors of the one or more sensor arrays). As another example, information pertaining to an output from one or more sensor arrays can be used to determine a dimension or size of an item to be singulated and/or another item or object within the workspace. The information received from the one or more sensor arrays may be used in connection with determining a height of the item to be singulated and/or another item or other object within the workspace. In some embodiments, the robotic system determines a path or trajectory (or updates the path or trajectory) based at least in part on height of the item to be singulated and/or another item or other object within the workspace. For example, the robotic system determines a location on the conveyor at which the item is to be placed based at least in part on a height (or other dimension) of one or more other items on the conveyor. Planning to place an item in a slot/tray adjacent to another slot/tray comprising a relatively large (e.g., tall, wide, etc.) item can increase the likelihood of a collision during singulation. In addition, a relatively large item on the conveyor can impede the ability of the robotic system to obtain information for adjacent items. The line of sight of the vision system may be blocked by a relatively large item and thus the sensor data may not include accurate information for adjacent items (or other items within close proximity to the large item). As another example, if the item includes an identifier or label on a side facing a relatively large item, or on a surface close to the large item, the vision system may be unable to locate or read the identifier or label.

Referring further to FIG. 1A, in the example shown, system 100 further includes an on-demand teleoperation device 218 usable by a human worker 120 to operate one or more of robotic arm 102, end effector 104, and conveyor 108 by teleoperation. In some embodiments, control computer 112 is configured to attempt to grasp and place items in a fully automated mode. However, if after attempting to operate in fully automated mode control computer 112 determines it has no (further) strategies available to grasp one or more items, in various embodiments, control computer 112 sends an alert to obtain assistance from a human operator via teleoperation, e.g., by human operator 120 using teleoperation device 118. For example, in some embodiments, in response to detecting a state or condition affecting item flow through chute 106, control computer 112 may attempt to perform one or more actions to facilitate singulation. If fully automated attempts to respond to the detected state or condition are determined not to have resolved the state or condition, control computer 112 may prompt human operator 120 to address the state or condition, e.g., via teleoperation using on-demand teleoperation device 118. In various embodiments, control computer 112 may display a user interface or other interface that identifies the state or condition and/or presents human selectable options to control the robotic arm 102, end effector 104, and/or other elements and instrumentalities as disclosed herein (e.g., blowers, shakers, chute conveyors, etc.) to alter the state or condition.

In various embodiments, control computer 112 uses image data from cameras such as cameras 114 and 116 to provide a visual display of the scene to human worker 120 to facilitate teleoperation. For example, control computer 112 may display a view of the pile of items in chute 106. In some embodiments, segmentation processing is performed by control computer 112 on image data generated by cameras 114 and 116 to discern item/object boundaries. Masking techniques may be used to highlight individual items, e.g., using different colors. The operator 120 may use the visual display of the scene to identify the item(s) to be grasped and use teleoperation device 118 to control the robotic arm 102 and end effector 104 to pick the item(s) from chute 206 and place each in a corresponding location on conveyor 108. In various embodiments, once the item(s) for which human intervention was prompted have been placed on the conveyor, the system 100 resumes fully automated operation. In various embodiments, in the event of human intervention, the robotic system observes the human worker (e.g., manual task completion, task completion using a robotic arm and end effector via teleoperation) and attempts to learn a strategy to (better) complete the task in an autonomous mode in the future. For example, the system may learn a strategy to grasp an item, e.g., by observing the places on the item at which a human worker grasps the item and/or by remembering how the human worker used the robotic arm and end effector to grasp the item via teleoperation.

In some embodiments, system 100 invokes assistance from human operator 120 in response to determining that an abnormality in the operation of system 100 exists. An example of an abnormality is a lack of a threshold pressure being attained between end effector 104 and the item during singulation of the item. In response to detecting that the pressure attained between end effector 104 and the item is less than a threshold pressure value, robot system 100 can perform a diagnostics process in connection with assessing whether robot system 100 is performing normally. For example, system 100 can perform a diagnostic of the ability of end effector 104 to engage an item and attain a predetermined threshold pressure value. In response to determining that system 100 is not performing normally (e.g., that the end effector 104 is not able to engage an item and attain a predetermined threshold pressure value), system 100 invokes assistance from human operator 120. In some embodiments, control computer 112 sends an alert to human operator 120. The alert can indicate the basis of the problem (e.g., an indication that the end effector is unable to engage the item and attain a predetermined threshold pressure value). For example, the alert can provide a recommended or requested remedial action to human operator 120.

Figure 1B:
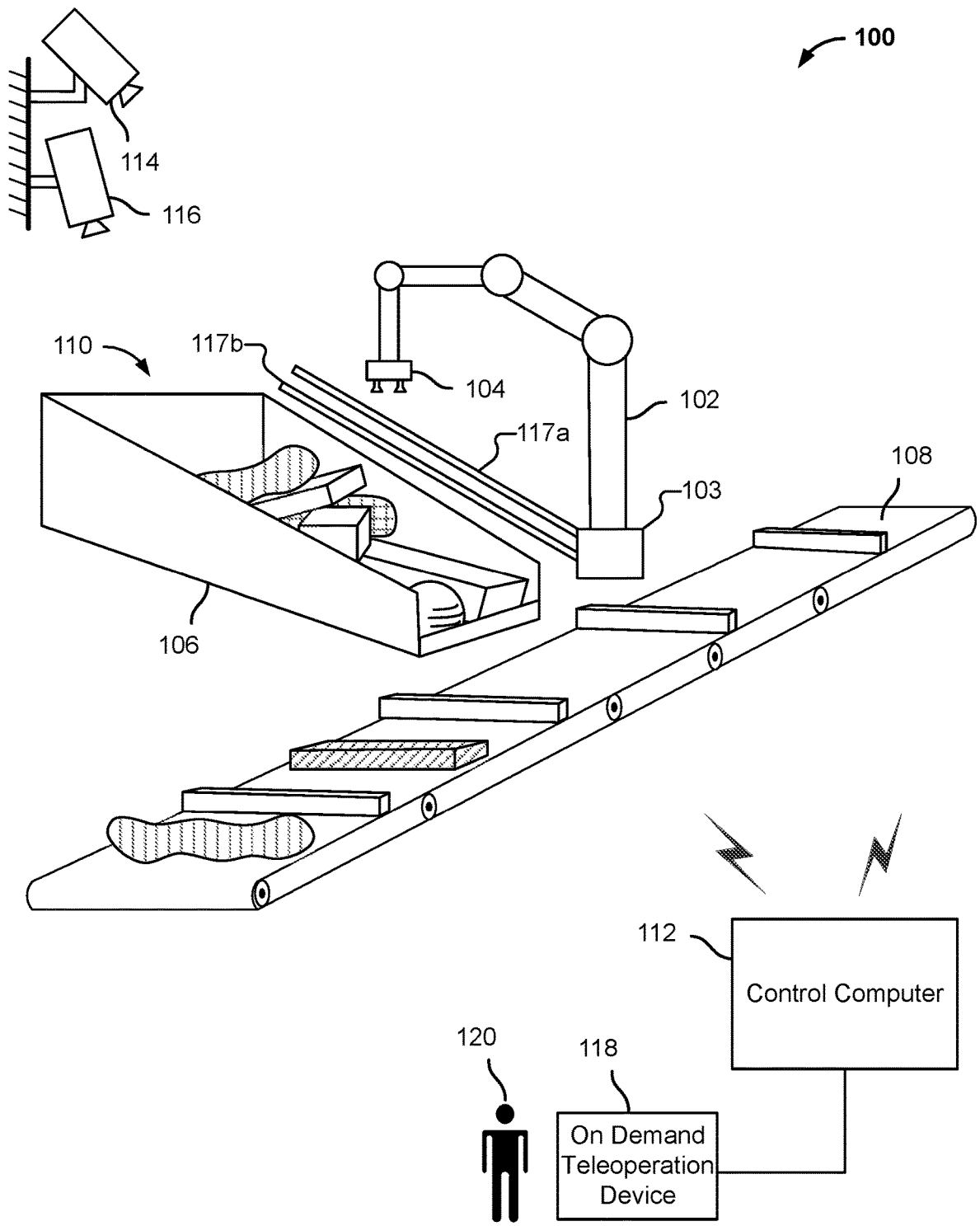
FIG. 1B is a diagram illustrating a robotic system to move one or more items according to various embodiments.

FIG. 1B is a diagram illustrating a robotic system to move one or more items according to various embodiments. In the example illustrated in FIG. 1B, system 100 comprises one or more structures 117a and 117b. Robot 102 may traverse a path defined by the one or more structures 117 and 117b. For example, robot 102 may be mounted to carriage 103, and carriage 103 (and robot 102) may traverse the path.

According to various embodiments one or more structures 117a and 117b may comprise a set of one or more rails, a set of one or more guides, a set of one or more channels, etc. Various other types of structures may be implemented to provide a secure/defined path along which the robot may be moved.

In some embodiments, the one or more structures 117 and 117b may comprise a first end (e.g., corresponding to a position at which robot 102 is in an active position) and a second end (e.g., corresponding to a position at which robot 102 is in an inactive position). In the example illustrated in FIG. 1B, the first end may be an end of the one or more structures 117 and 117b that is closest to conveyor 108 (and chute 106), and the second end may be an end that is further away from conveyor 108 (and chute 106).

According to various embodiments, when robot 102 (e.g., and carriage 103) is at the first end (e.g., in the active position), robot 102 may be coupled to an anchor structure. The coupling of robot 102 to the anchor structure may be quick, easy, and secure. In some embodiments, when the robot 102 is coupled to the anchor structure, robot 102 may operate (e.g., move items such as from chute 106 to conveyor 108). Robot 102 may operate while coupled to the anchor structure, and the coupling to the anchor structure may be sufficient to prevent the robot from moving and/or vibrating such as in response to dynamic forces generated during operation/movement of robot 102. System 100 may include one or more sensors that obtain information pertaining to a positioning of robot 102 and/or carriage 103. For example, the information obtained by the one or more sensors may be used in connection with determining whether a positioning of the robot has deviated from the active position. In response to a determination that a position of the robot has deviated from the active position, or that the robot/carriage has vibrated (e.g., more than a vibration threshold), operation of the robot 102 may be stopped. Detection of a movement/vibration of robot 102 may be used as a triggering to stop robot with respect to ensuring that operation of robot 102 is safe for human operators in the area. In some embodiments, the system 100 will not operate robot 102 until or unless information obtained by the one or more sensors monitoring a positioning of the robot 102/carriage 103 is in the active position and/or coupled to the anchor structure.

Figure 1C:
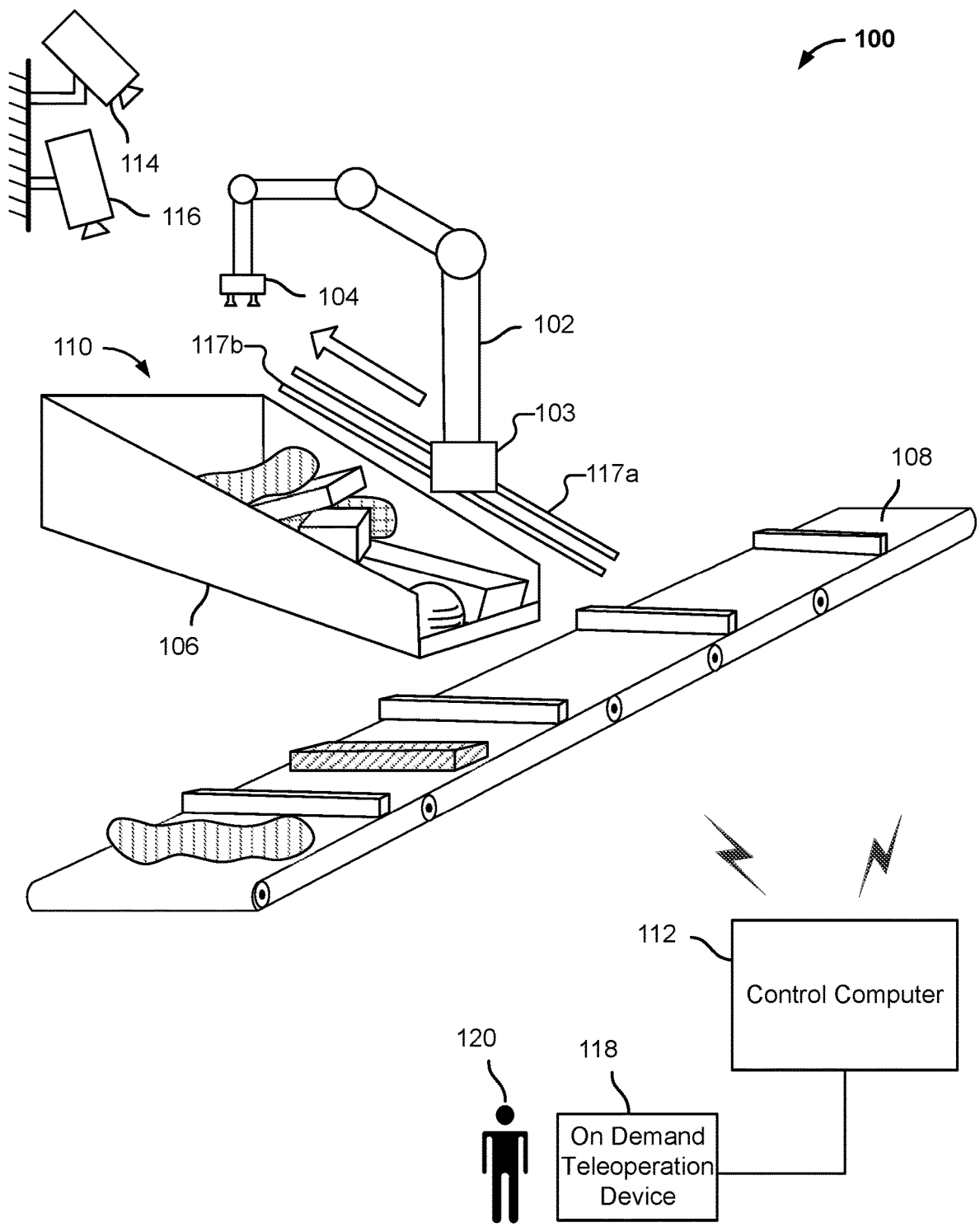
FIG. 1C is a diagram illustrating a robotic system to move one or more items according to various embodiments.

FIG. 1C is a diagram illustrating a robotic system to move one or more items according to various embodiments. In the example illustrated in FIG. 1C, carriage 103 (e.g., and robot 102) traverses a path defined by the one or more structures 117 and 117b. For example, robot 102 is illustrated as being moved towards the second end corresponding to the inactive position.

Figure 2:
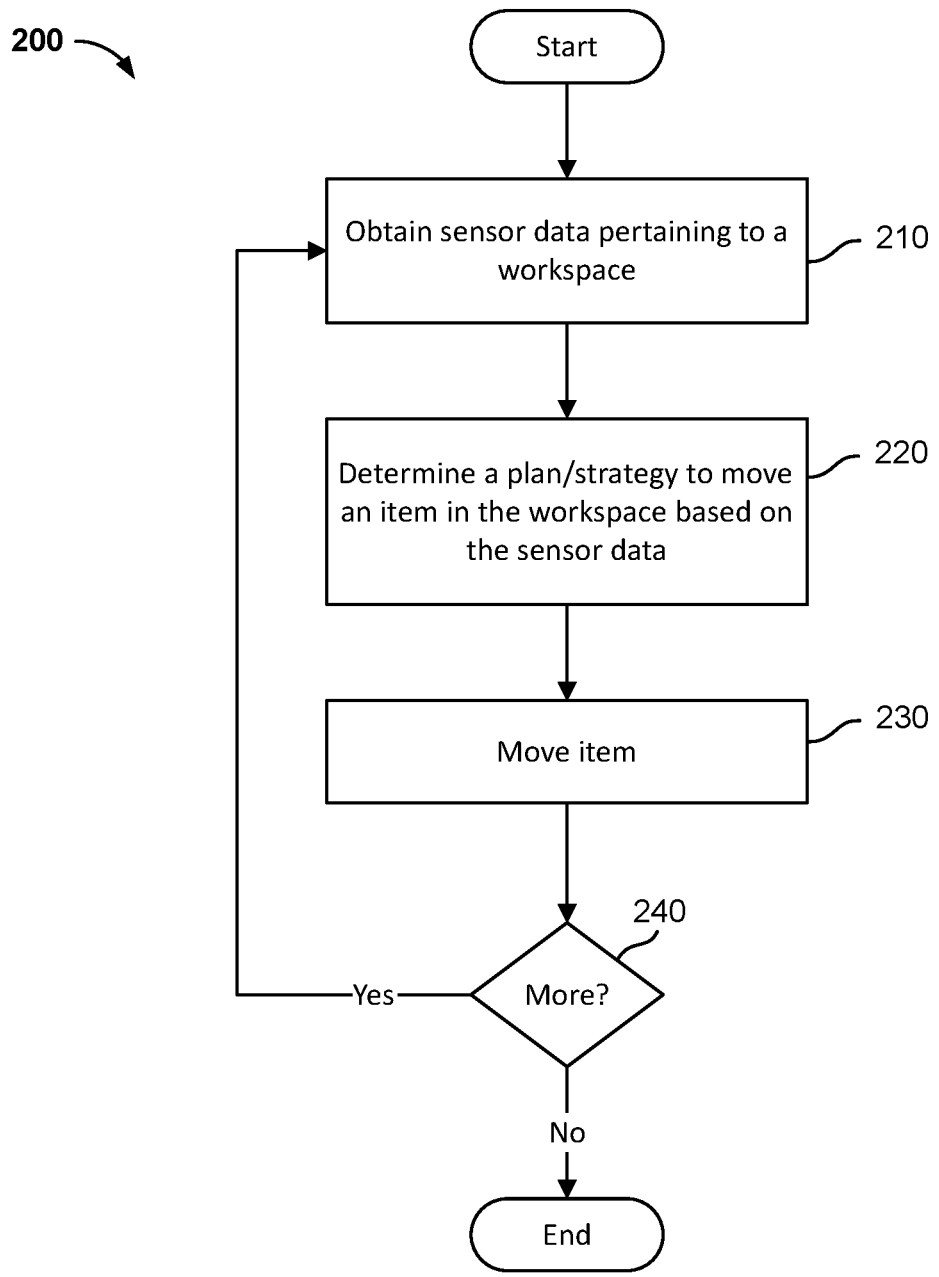
FIG. 2 is a flow diagram of a method for moving one or more items according to various embodiments.

FIG. 2 is a flow diagram of a method for moving one or more items according to various embodiments. In some embodiments, process 200 is implemented by a robot system operating to singulate one or more items within a workspace, such as system 100 of FIG. 1A, FIG. 1B, and FIG. 1C. The robot system may include one or more processors that operate to cause a robotic structure (e.g., a robotic arm) to pick and place items for sorting.

At 210, sensor data pertaining to a workspace is obtained. In some embodiments, a robotic system obtains the sensor data pertaining to the workspace from one or more sensors operating within the system. As an example, the sensor data is obtained based at least in part on outputs from image sensors (e.g., 2D or 3D cameras), an infrared sensor array, a laser array, a scale, a gyroscope, a current sensor, a voltage sensor, a power sensor, a force sensor, a pressure sensor, and the like.

According to various embodiments, the obtained sensor data pertaining to the workspace comprises information from which a model of the workspace may be generated. For example, one or more characteristics associated with the workspace may be determined based at least in part on the sensor data. The sensor data can be used in connection with determining at least one characteristic (e.g., attribute) of one or more items within the workspace such as items in the source pile/flow of the chute, or an item grasped by the robotic arm, and the item already positioned in a slot/tray on the conveyor, etc. In some embodiments, the sensor data is used in connection with determining one or more characteristics of the conveyance structure such as determining the slots on the conveyor that are empty or unreserved, determining a speed of the conveyor, and/or determining the characteristics of at least one slot or of at least one item already on the conveyor.

At 210, a plan or strategy to move an item in the workspace is determined based at least in part on the sensor data. The plan or strategy to move the item in the workspace may include one or more of a plan or strategy to singulate the item, to kit the item, and/or to palletize/depalletize the item.

In some embodiments, a robotic system determines the plan or strategy to pick at least one item from a source pile/flow in the workspace and to singly place the at least one item in a slot on the conveyor. The plan or strategy to singulate the one or more items is determined in various embodiments on a robot by robot basis such that if the robotic system includes a plurality of robots, each robot operates independent of the other robot(s).

According to various embodiments, the plan or strategy to singulate the one or more items in the workspace is determined based at least in part on the sensor data, such as sensor data including data associated with an item present in a workspace (e.g., the item to be singulated and/or an item already located on the conveyor) or another object included in the workspace. For example, the plan or strategy to singulate the one or more items includes selecting an item within the source pile/flow that is to be singulated. The selected item can be identified from among other items or objects within the workspace based at least in part on the sensor data (e.g., the boundaries of the item and other items or objects within the workspace can be determined). As an example, one or more characteristics (or attributes) pertaining to the selected item is determined based at least in part on the sensor data. The one or more characteristics pertaining to the selected item can include a dimension of the item, a packaging of the item, one or more identifiers or labels on the item (e.g., an indicator that the item is fragile, a shipping label on the item, etc.), a height of the item, a length of the item, an estimated weight of the item, and the like, or any combination thereof. As another example, the plan to singulate the one or more items includes determining a location on the conveyance structure (e.g., a slot on the conveyor) at which the robotic structure (e.g., the robotic arm) is to singly place the item. The location on the conveyance structure at which the item is to be placed can be determined based at least in part on a timestamp, a speed of the conveyor, and one or more characteristics of a slot in the conveyor (e.g., an indication of whether the slot is occupied or reserved), and the like, or any combination thereof. As another example, the plan or strategy to singulate the one or more items includes determining a path or trajectory of the item along which the robotic arm is to move the item during singulation. The path or trajectory of the item along which the item is to be moved can be determined based at least in part on a location of one or more other objects within the workspace such as a frame of the chute, other items in the source pile/flow, items on the conveyor, other robots operating within the workspace, a reserved airspace for operation of other robots, sensors within the workspace, etc. For example, the path or trajectory of the item is determined to move a part of the item comprising an identifier (e.g., a shipping label) to an area at which a scanner is able to scan the identifier, or the path or trajectory of the item is determined to maximize a likelihood that the identifier on the item is read by one or more scanners along the path or trajectory.

In some embodiments, the determination of the plan to singulate an item includes a determination of a manner by which the applicable robotic arm is to grasp the item. The plan to singulate the item can indicate a particular end effector to be used to pick up the item from the source pile, and one or more settings associated with the end effector in connection with grasping the item such as a grasp strength, a pressure to apply on a suction-based end effector, etc. The plan to singulate the item can indicate an orientation of one or more of the robotic arm, a wrist on the robotic arm, and the end effector. In some embodiments, the end effector is positioned to be orthogonal to the item when grasping the item. To so position the end effector in relation to the item, the robotic structure can control to operate the orientation of one or more of the robotic arm, a wrist on the robotic arm, and the end effector.

At 230, the item is moved. The moving of the item may include one or more of singulating the item, kiting the item, and/or palletizing/depalletizing the item.

In some embodiments, the item is singulated in response to the plan or strategy for singulating the item being determined. For example, a robotic arm is operated to pick one or more items from the workspace and place each item singly in a corresponding location in a singulation conveyance structure. The singulation of the item comprises picking the item from the workspace (e.g., from the source pile/flow) and singly placing the item on the conveyance structure. The robotic system singulates the item based at least in part on the plan or strategy for singulating the item. For example, the robotic system singulates the item along a path or trajectory according to the plan or strategy to singulate the item.

At 240, a determination is made as to whether further items are to be singulated. If there are more items, a further iteration of steps 210, 220, and 230 is performed, and successive iterations are performed until it is determined at 240 that there are no more items in the chute (or other receptacle or source) to be picked and placed.

Figure 3:
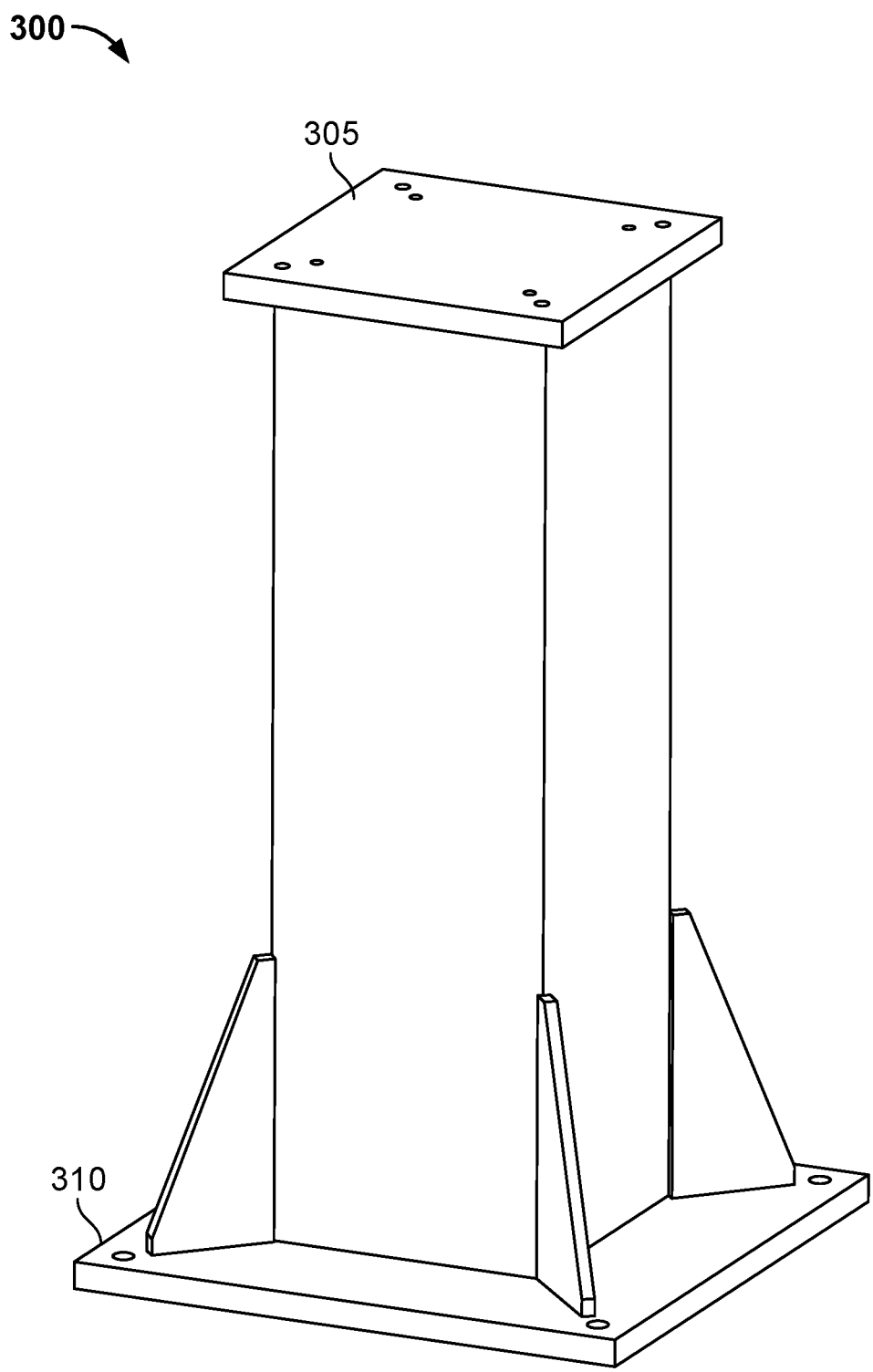
FIG. 3 is a diagram of an example of a riser for providing support to a robot arm.

FIG. 3 is a diagram of an example of a riser for providing support to a robot arm. In the example illustrated in FIG. 3, a riser 300 is provided. Riser 300 comprises a mounting surface 305 on which equipment is mounted. The equipment mounted to the mounted to riser 300 via mounting surface 305 may be a robot such as robot arm 102 of FIG. 1A, FIG. 1B, and/or FIG. 1C. The riser 300 also includes a base 310 with which the riser (and equipment) is mounted to a workspace in which the equipment is to operate. For example, the base 310 may be mounted to a floor or other surface of a warehouse or location at which the equipment is deployed. The mounting of the riser (e.g., via base 310) may include bolting the riser 300 to the workspace. Such a mounting of the riser 300 (and equipment) is a relative permanent coupling of the riser 300 to the workspace. For example, the riser and/or equipment may not be moved to another location in the workspace or in the warehouse without significant manual labor by one or more human operators. In order to move the riser 300 and/or equipment mounted thereon, one or more human operators would need to remove the bolts coupling the base 310 to the floor or other surface, and then manually lift the riser 300 and carry the riser to the desired location. Such a process for moving the riser 300 and/or equipment mounted thereon is thus undesirable if the equipment is to be moved for a short period of time such as when a human operator is to clear a jam of items, replace a component on an end effector (e.g., a suction cup), to perform a manual moving of an item in the workspace (e.g., to singulate, kit, or palletize an item), etc.

Figure 4:
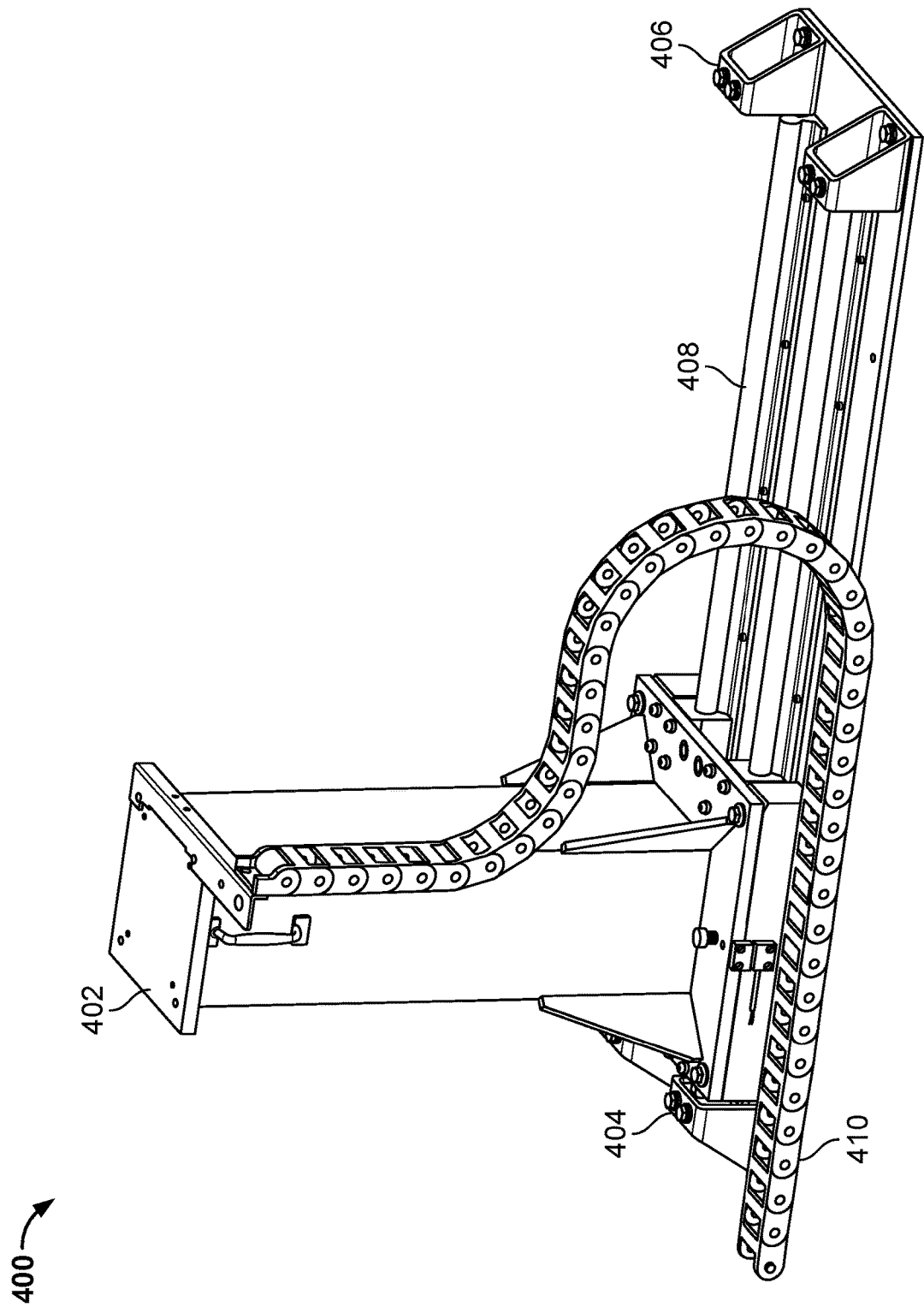
FIG. 4 is a diagram of a repositionable riser system according to various embodiments.

FIG. 4 is a diagram of a repositionable riser system according to various embodiments. In the example illustrated in FIG. 4, a repositionable riser 400 or repositionable riser system is provided. The repositionable riser 400 may be configured to enable a human operator to move an equipment such as a robot between an active position and an inactive position with relative ease and speed.

According to various embodiments, the repositionable riser 400 system comprises a riser 402. The riser 402 may be a structure on which equipment, such as a robotic arm, is mounted. The riser 402 may be a rigid structure that, when coupled in a certain position such as the active position at which the equipment may be operated, the riser 402 does not move or vibrate with ease (e.g., the riser 402 maintains the equipment in the active position during operation of the equipment). In some embodiments, the robotic arm mounted on the riser 402 may be a six-axis robot arm or robotic arm having six degrees of freedom.

In some embodiments, the repositionable riser 400 comprises one or more structure (e.g., one or more elongated structures 408). The one or more elongated structures 408 define a constrained lateral path along which the carriage is movable, the path including a first end 404 associated with active use of the equipment and a second end 406 not associated with active use of the equipment, and an anchor structure to which one or both of the carriage and the riser are configured to be coupled to secure the riser at the first end. The one or more elongated structures 408 may comprise one or more of a set of one or more rails, a set of one or more guides, a set of one or more channels, any combination thereof, etc. Various other types of structures may be implemented to provide a secure/defined path along which the robot may be moved.

In various embodiments, a repositionable riser (or fallback riser) as disclosed herein can be positioned securely and precisely in a first position/location (e.g., first end 404), in which the robot is positioned to operate, or moved to and secured in a second position (e.g., second end 406 by unsecuring the riser and manual sliding the riser on low friction guides/rails (e.g., the one or more elongated structures 408).

In some embodiments, the repositionable riser 400 comprises a cable or hose (or tube) tracker 410. The cable or hose tracker 410 may a first end that is mounted or coupled to riser 402. Cable or hose tracker 410 may at least partially encase one or more cables or hoses. In some embodiments, the one or more cables or hoses connect to the robot to provide the robot with connection to various sources such as power, network communications, and/or fluids (e.g., compressed air for pneumatic control of an element of the robot such as a suction-based end effector). In some embodiments, the cable or hose tracker avoids tangling or chafing of the one or more cables or hoses as the riser 402 moves between the first end and the second end. As an example, cable or hose tracker 410 may be configured to maintain at least partial encasement of the one or more cables or hoses as the robot traverses between the first end 404 and the second end 406. As another example, the cable or hose tracker 410 may maintain organization of the cable or hose tracker 410 as the robot moves along the path defined by the one or more elongated structures 408. The cable or hose tracker 410 may be flexible. In some embodiments, the cable or hose tracker 410 comprises one or more joints or pivot points. For example, as illustrated in FIG. 4, cable or hose tracker 410 conforms to the path constrained lateral path along which the carriage is movable and/or the positioning of the riser 402 relative to the one or more elongated structures 408. The cable or hose tracker 410 may comprise a flexible conduit made up of links joined at bendable joints, to avoid damaging cables or pinching pneumatic air tubes.

Figure 5:
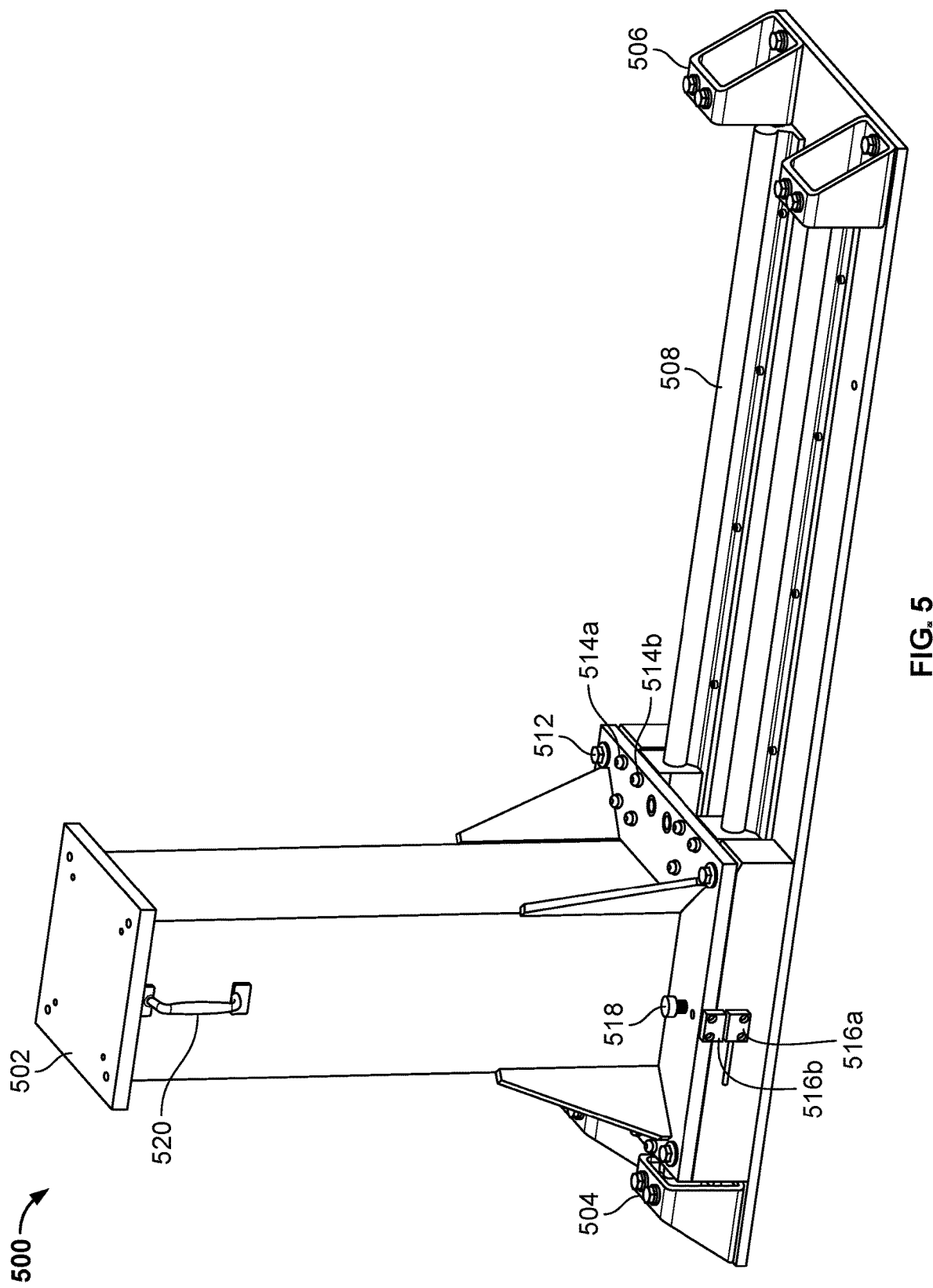
FIG. 5 is a diagram of a repositionable riser system according to various embodiments.

FIG. 5 is a diagram of a repositionable riser system according to various embodiments. In the example illustrated in FIG. 5, a repositionable riser 500 or repositionable riser system is provided. The repositionable riser 500 may be configured to enable a human operator to move an equipment such as a robot between an active position and an inactive position with relative ease and speed.

According to various embodiments, the repositionable riser 500 system comprises a riser 502. The riser 502 may be a structure on which equipment, such as a robotic arm, is mounted. The riser 502 may be a rigid structure that, when coupled in a certain position such as the active position at which the equipment may be operated, the riser 502 does not move or vibrate with ease (e.g., the riser 502 maintains the equipment in the active position during operation of the equipment). In some embodiments, the robotic arm mounted on the riser 502 may be a six-axis robot arm or robotic arm having six degrees of freedom.

In some embodiments, the repositionable riser 500 comprises one or more structures 508. The one or more structures may correspond to the one or more elongated structures 408 of FIG. 4. According to various embodiments, repositionable riser 500 may comprise a translational subsystem comprising the one or more structures 508. The one or more structures 508 define a constrained lateral path along which the carriage is movable, the path including a first end 504 associated with active use of the equipment and a second end 506 not associated with active use of the equipment, and an anchor structure to which one or both of the carriage and the riser are configured to be coupled to secure the riser at the first end. The one or more structures 508 may comprise one or more of a set of one or more rails, a set of one or more guides, a set of one or more channels, any combination thereof, etc. Various other types of structures may be implemented to provide a secure/defined path along which the robot may be moved.

According to various embodiments, riser 502 may be mounted on a carriage that traverses between the first end 504 and the second end 506 on or in the one or more structures 508. The riser/robot may be manually moved between the first end 504 and the second end 506 by a human operator. For example, one or both of the riser and the robot may include a handle 502 with which the human operator may easily grasp the riser/robot to move the robot along the one or more structures 508 (e.g., to the active position or the inactive position). The carriage may comprise one or more low friction rail bearings that slide along the one or more structures (e.g. one or more rails). In some embodiments, when riser 502 (or the one or more carriages on which riser is coupled) is not engaged with an anchor structure at the first end 504, a human operator may use handle 520 to move riser 502 (and the robot mounted thereon) along the path defined by the one or more structures.

In some embodiments, repositionable riser 500 comprises one or more sensors such as sensors 516a and/or 516b. The sensors 516a and/or 516b may be safety sensors that are configured to detect whether riser 502 is securely positioned in an active position. In some embodiments, the safety sensor(s) may be disposed on or within an anchor structure and/or the riser 502. For example, as illustrated in FIG. 5, a sensor pair used to detect whether riser 502 is securely positioned in an active position comprises a sensor 516a disposed on an anchor structure or base of repositionable riser 500 and a sensor 516 disposed on a base of riser 502. In some embodiments, one or more sensors (e.g., a safety sensor) is comprised in the lateral translation subsystem. As an example, the carriage may comprise a sensor that may be used to determine whether the carriage is at the first end (e.g., that riser 502 is in the active position). As another example, the base or one or more structures 508 may comprise a sensor that is may be used to determine whether the carriage is at the first end. The one or more sensors (e.g., safety sensor(s)) may comprise a camera (e.g., a 3D camera), an infrared sensor array, a laser array, a scale, a gyroscope, a current sensor, a voltage sensor, a power sensor, a force sensor, a pressure sensor, a weight sensor, and the like. Various other sensors may be used in connection with determining a location of the robot/riser 502 and/or determining whether the robot/riser 502 is in the active position.

According to various embodiments, repositionable riser 500 comprises one or more locating pins such as locating pin 518. The locating pin may be used in connection with determining that riser 502 and/or the carriage on which riser 502 is mounted is in the active position. For example, the locating pin may extend through a hole in base of riser 502 and may engage with a hole disposed at the first end 504 of the repositionable riser 500. In some embodiments, the hole with which the locating pin engages when the riser 502 is in the active position is comprised in an anchor structure (e.g., one or more anchor blocks). In response to determining that the locating pin has engaged the corresponding hole at the first end 504, a human operator may manually couple riser 502 at the first end 504 (e.g., to an anchor structure of repositionable riser 500). For example, the human operator may couple riser 502 with one or more screws, bolts, or cam levers, or any combination thereof. Various other devices for coupling the riser 502 to the first end 504 may be implemented. In some embodiments, a locating pin may be comprised in the carriage (e.g., the carriage to which riser 502 is mounted) and the hole with which the locating pin engages at the active position may be comprised in an anchor structure or in the translational subsystem (e.g., the one or more structures 508). In some embodiments, the hole with which a locating pin engages at the active position may be comprised in a base plate of the repositionable riser 500. In some embodiments, to prevent the locating pin from restricting the carriage or riser 502 from proceeding to the first end 504, an anchor structure or other structure that may be in the path of the locating pin has a chamfer or profile (e.g., to allow the locating pin to follow, or move according to, the profile of the anchor structure or other structure within its path until the pin engages the corresponding hole at the active position). Engagement of the locating pin with the corresponding hole at the active position may allow the riser 502 to be loosely or temporarily held in place at the active position while the riser 502 is more securely coupled/mounted at the at the active position (e.g., while a human operator bolts the riser 502 to the anchor structure).

According to various embodiments, repositionable riser 500 may comprise one or more riser anchoring fasters such as anchoring fastener 512. The one or more anchoring fasteners may be used in connection with coupling/mounting the riser 502 or carriage to the first end 504 (e.g., the active position). For example, the one or more anchoring fasteners may be used in connection with coupling/mounting the riser 502 or carriage to an anchor structure (e.g., one or more anchor blocks at the first end 504). The one or more anchoring fasteners (and the engagement thereof at the first end 504) may be configured to provide sufficient coupling/mounting to maintain the riser 502 and/or robot mounted on riser 502 in the active position while the robot is operating. For example, the one or more anchoring fasteners mount the riser 502 at the active position to provide stability (e.g., resistance to movement and/or relatively large vibration such as a vibration in excess of a vibration threshold) even under the context of dynamic forces generated by operation of the robot when the robot is in the active position.

According to various embodiments, repositionable riser 500 comprises riser 502 disposed on lateral translation subsystem that is configured to traverse the one or more structures 508. The lateral translation subsystem may comprise a carriage. For example, the carriage may carry riser 502 and/or the robot mounted on riser 502 along the path defined by the one or more structures 508 (e.g., between the first end 504 and the second end 506). In some embodiments, the riser 502 is coupled to the lateral translation subsystem (e.g., a carriage of the lateral translation subsystem) using one or more height limiting fasteners 514a and/or 514b. As illustrated in FIG. 5, riser 502 may be mounted/coupled to an anchor structure. In some embodiments, the coupling between riser 502 and the lateral translation subsystem (e.g., a carriage of the lateral translation subsystem) includes a biasing of riser 502 to create a clearance between riser 502 and the anchor structure. For example, the riser 502 is biased in a direction perpendicular to the top surface of the anchor structure (e.g., upwards) to provide sufficient clearance for riser 502 to be moved to the first end 504 (e.g., the active position). In some embodiments, when riser 502 is positioned at the active position (e.g., when the locking pin 518 engages with a hole in the anchor structure), riser 502 may be coupled to the anchor structure in a manner that riser 502 engages the anchor structure (e.g., the clearance between riser 502 and the anchor structure is removed). If the riser 502 is to be moved towards second end 506, riser 502 is decoupled from the anchor structure (e.g., the anchoring fastener 512 is loosened and/or removed from the anchor structure), and riser 502 is biased to create a clearance between a bottom surface of riser 502 and the anchor structure, and a human operator may move riser 502 along the lateral path defined by the one or more structures 508. In some embodiments, the biasing of riser 502 is based on one or more springs loaded on the lateral translation subsystem (e.g., one or more springs disposed on the carriage), and the one or more springs provide sufficient biasing force to riser 502 to lift riser 502 and the equipment (e.g., a robot) mounted on riser 502.

Figure 6:
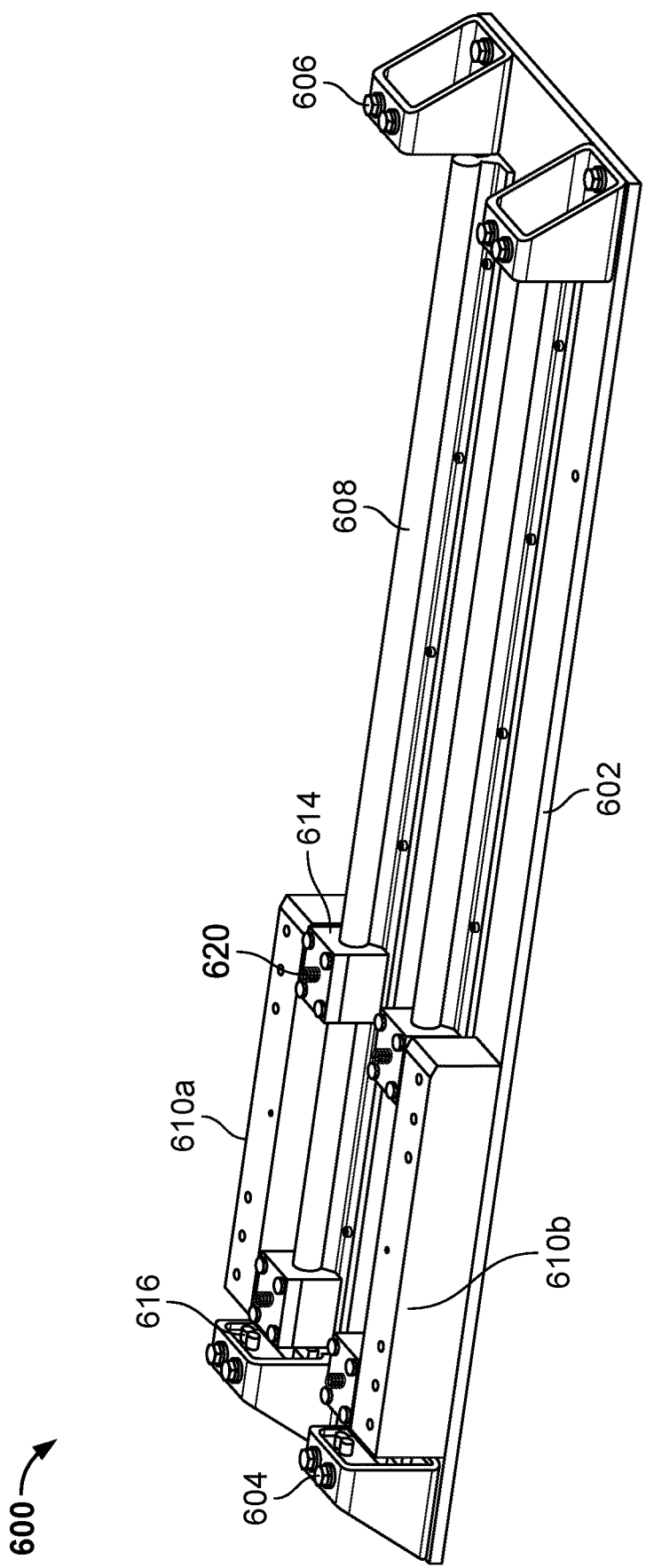
FIG. 6 is a diagram of a repositionable riser system according to various embodiments.

FIG. 6 is a diagram of a repositionable riser system according to various embodiments. In the example illustrated in FIG. 6, a repositionable riser 600 or repositionable riser system is provided. The repositionable riser 600 may be configured to enable a human operator to move an equipment such as a robot between an active position and an inactive position with relative ease and speed. In the example illustrated in FIG. 6, the repositionable riser 600 is illustrated with the riser being removed to provide illustration of a lateral translation subsystem.

According to various embodiments, the repositionable riser 600 system comprises a riser (not shown). The riser may be moved to be repositioned at different locations along a lateral path defined by a translational subsystem. The translational subsystem may comprise one or more structures 608. The one or more structures 608 may correspond to the one or more elongated structures 408 of FIG. 4. The one or more structures 608 may define a constrained lateral path along which the carriage is movable, the path including a first end 604 associated with active use of the equipment and a second end 606 not associated with active use of the equipment, and an anchor structure to which one or both of the carriage and the riser are configured to be coupled to secure the riser at the first end. The one or more structures 608 may comprise one or more of a set of one or more rails, a set of one or more guides, a set of one or more channels, any combination thereof, etc. Various other types of structures may be implemented to provide a secure/defined path along which the robot may be moved.

According to various embodiments, repositionable riser 600 may comprise one or more stops disposed at one or more of the first end 604 and the second end 606, such as stop 616. In some embodiments, repositionable riser 600 may comprise a stop that provides a structure that provides a support at the end of the one or more structures 608 (e.g., rails) to prevent the carriage from moving past the first end 604 or second end 606 (or otherwise falling off an end of the rail). For example, as illustrated in FIG. 6, stop 616 may provide an internal surface that has a face substantially perpendicular to the lateral path defined by the one or more structures 608. The one or more stops may provide a cushioning or absorption of the force when the riser and/or carriage reaches the end of the one or more structure 608 (e.g., in the event that the riser or carriage hits the support structure at the end of the one or more structures 608). In some embodiments, the one or more supports comprise a soft material or a material that absorbs the force of the riser or carriage. For example, the one or more stops may be rubber. Various other types of material may be used for the stops.

According to various embodiments, the riser may be mounted on a carriage that traverses between the first end 604 and the second end 606 on or in the one or more structures 608. In the example illustrated in FIG. 6, the carriage may include one or more rail bearings such as rail bearing 614. The one or more rail bearings may provide a relatively frictionless interaction (e.g., a low friction interaction) between the riser and the one or more structures 608. The riser/robot may be manually moved between the first end 604 and the second end 606 by a human operator. For example, the carriage may comprise one or more low friction rail bearings that slide along the one or more structures (e.g., one or more rails). In some embodiments, the carriage comprises one or more elements that cause the riser to be positioned at a height sufficient for the riser to have clearance over the anchor structure (e.g., including anchor block 610a and 610b) when the riser is not coupled/mounted to the anchor structure (e.g., mounted using an anchoring fastener such as anchoring fastener 512 of FIG. 5. In some embodiments, the one or more elements that cause the riser to be positioned at a height sufficient for the riser to have clearance comprise one or more springs such as bearing spring 620. The one or more springs may be biased in an upwards direction, or a direction that is perpendicular to a surface to which the riser is mounted to the anchor structure. As an example, when the riser is coupled to the anchor structure such as an anchoring fastener, the one or more springs may be compressed such that the riser engages/touches the anchor structure. However, when the anchoring fastener is loosened or removed, the one or more springs apply a force against the riser or otherwise cause the riser to lift such that a clearance between the riser and the anchor structure is formed.

In some embodiments, repositionable riser 600 comprises one or more elements that limit a movement of the riser when the riser is not coupled to the anchor structure. For example, the one or more elements may limit a height of a clearance formed between the riser and the anchor structure when the anchoring fastener is loosened or removed (e.g., when the riser is not coupled to the anchor structure). In some embodiments, the one or more elements comprise one or more height limiting fasteners. The height limiting fasteners allow bearing springs (e.g., bearing spring 620) to create a limited clearance to facilitate moving the riser along the one or more structures 608 (e.g., guides, rails, etc.).

According to various embodiments, repositionable riser 600 comprises an anchor structure to which the riser may be operatively coupled. In some embodiments, the anchor structure corresponds to a structure to which one or both of the carriage and the riser are configured to be coupled to secure the riser at the first end 604. As illustrated in FIG. 6, the anchor structure may comprise one or more anchor blocks (e.g., anchor block 610a, anchor block 610b, etc.). The anchor structure may provide a sufficient foundation for the riser or carriage in to prevent the robot or other equipment mounted to the riser from moving or vibrating (e.g., more than a vibration threshold) when the robot/equipment is operating. In some embodiments, the anchor structure is coupled to (e.g., mounted on) a base plate 620. As an example, the base plate 620 may be mounted (e.g., bolted) to a floor of a warehouse such as at the workspace at which the robot is to be deployed. In some embodiments, the base plate 620 and/or the combination of the various components of the repositionable riser 600 are of sufficient weight to withstand the dynamic forces generated in connection operation of the robot or the moving to of the robot between the first end 604 and the second end 606.

In various embodiments, anchor blocks 610a and 610b are secured to a base plate 602, as shown in FIG. 6, and anchor blocks 610a and 610b provide a fixed frame of reference and a secure attachment point when the riser is in position to be used (e.g., in the active position). When the riser is not secured to the anchor blocks, bearing springs, such as bearing spring 620, on the bearing rails lift the riser up, to create a clearance that enables the riser to be moved manually along the rails, riding on the rail bearings, up until the riser engages the end stops.

Figure 7A:
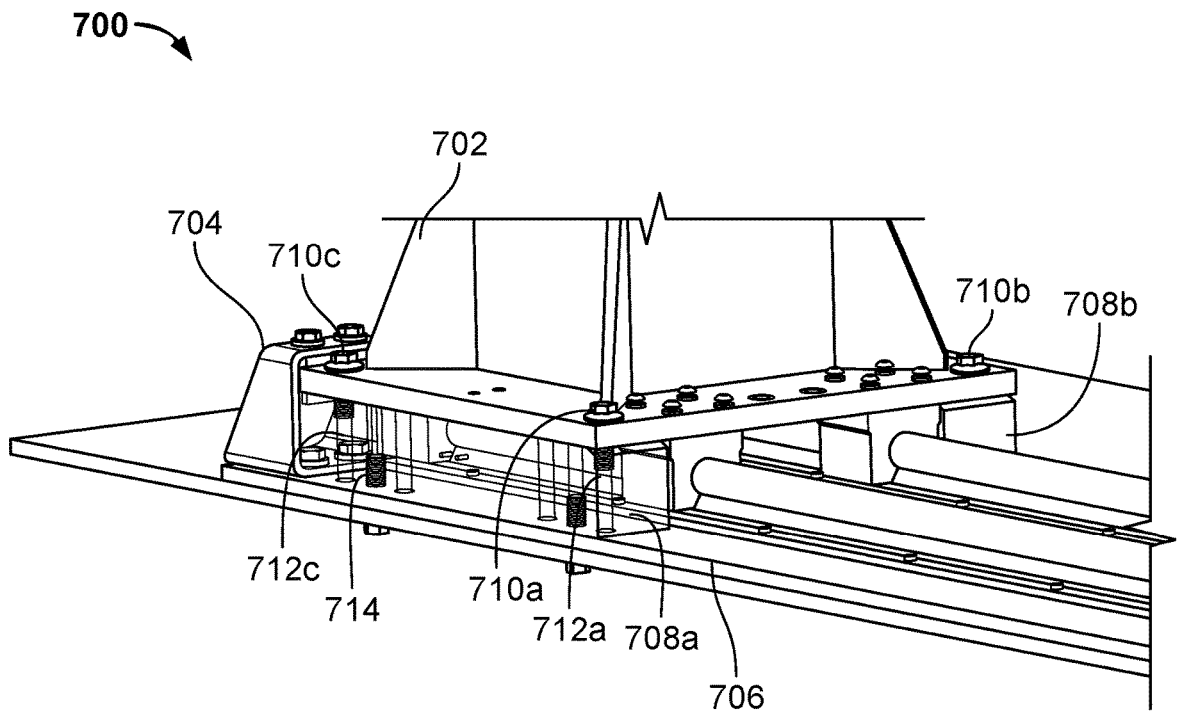
FIG. 7A is a diagram of a repositionable riser system according to various embodiments.

FIG. 7A is a diagram of a repositionable riser system according to various embodiments. In the example illustrated in FIG. 7A, a repositionable riser 700 or repositionable riser system is provided. The repositionable riser 700 may be configured to enable a human operator to move an equipment such as a robot between an active position and an inactive position with relative ease and speed.

According to various embodiments, the repositionable riser 700 system comprises a riser 702. The riser 702 may be a structure on which equipment, such as a robotic arm, is mounted. The riser 702 may be a rigid structure that, when coupled in a certain position such as the active position at which the equipment may be operated, the riser 702 does not move or vibrate with ease (e.g., the riser 502 maintains the equipment in the active position during operation of the equipment). In some embodiments, the robotic arm mounted on the riser 702 may be a six-axis robot arm or robotic arm having six degrees of freedom.

In the example illustrated in FIG. 7A, rise 702 is positioned at first end of the repositionable riser 700 (e.g., at the active position at which the robot may operate in the workspace). In some embodiments, repositionable riser 700 comprises an anchor structure to which one or both of the riser and a carriage to which the riser may be mounted are configured to be coupled to secure the riser at the first end.

The anchor structure may comprise one or more anchor blocks, such as anchor block 708a and anchor block 708b. As illustrated in FIG. 7A, anchor block 708a and anchor block 708b may be disposed on opposing sides of the one or more elongated structures (e.g., that define a lateral path along which riser 702 traverses).

Anchor blocks may be fastened down (e.g., to a base plate and/or the ground) to secure the repositionable riser 700. The one or more anchor blocks may be mounted to a base plate 706 of the repositionable riser 700. As illustrated in FIG. 7A, anchor block 708a may be mounted to base plate 706 via one or more fasteners such as fastener 714. The one or more fasteners may be a bolt. Various other types of fasteners may be implemented. In some embodiments, the illustrated in FIG. 7A, anchor block may be mounted to the base plate using one or more fasteners that engage the anchor block from a bottom surface such as a surface that engages the base plate 706 (e.g., the bottom surface may be a surface that opposes a surface engaged by riser 702 when riser 702 is in the active position). The one or more anchor blocks may have one or more holes (e.g., threaded holes) by which the one or more fasteners may engage the one or more anchor blocks.

According to various embodiments, one or both of the carriage and the riser 702 are configured to be coupled to the anchor structure to secure the riser at the first end 704. As illustrated in FIG. 7A, the anchor structure (e.g., anchor block 708a) may have one or more holes therein by which by which the one or more fasteners (e.g., anchoring fastener 710a, anchoring fastener 710b, and/or anchoring fastener 710c) may engage the one or more anchor blocks. The one or more holes may comprise a threaded hole. In the example illustrated in FIG. 7A, threaded block 708a comprises hole 712a and hole 712c. Hole 712a and a hole 712c may correspond to threaded holes. A tightening of a fastener (e.g., a bolt) inserted into at least one of the one or more threaded holes (e.g., anchoring fastener 710a inserted into hole 712a and/or anchoring fastener 710c inserted into hole 712c) causes the riser to engage at least one of the one or more anchor blocks.

Figure 7B:
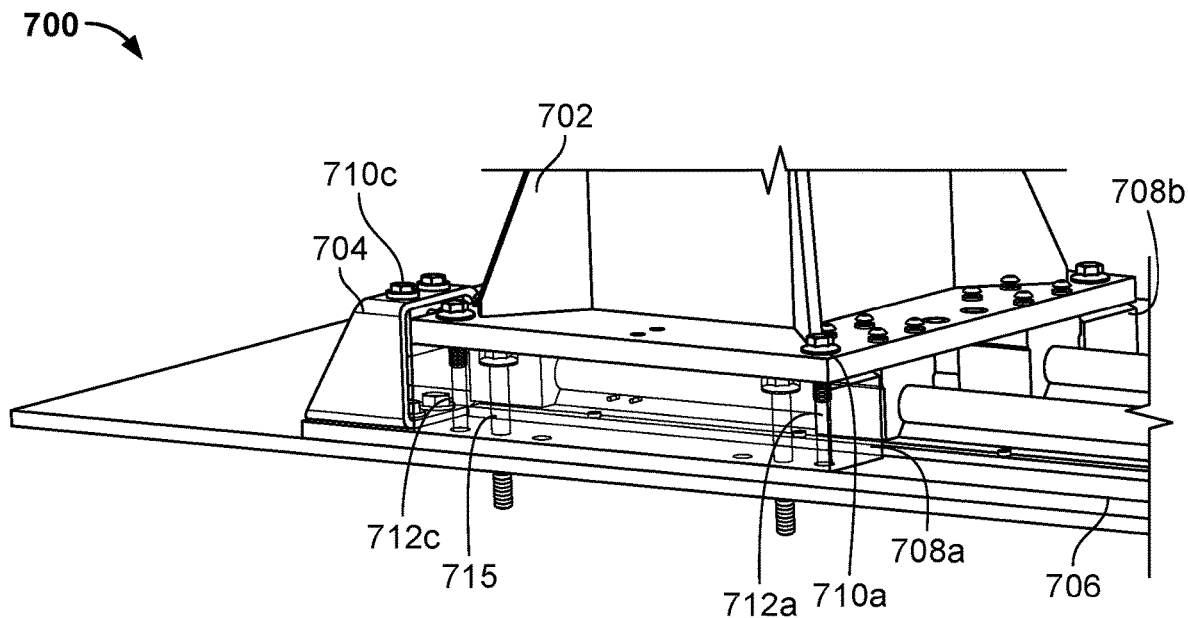
FIG. 7B is a diagram of a repositionable riser system according to various embodiments.

FIG. 7B is a diagram of a repositionable riser system according to various embodiments. In the example illustrated in FIG. 7B, anchor block 708a may be fastened to base plate 706 or the ground from a top of anchor block 708a. For example, anchor block 708a may have one or more through holes through which a fastener is inserted to engage with base plate 706 or the ground. As an example, fastener 715 is inserted via a hole in the anchor block 708a from a top surface (e.g., beneath riser 702), and fastener 715 is illustrated as engaging fastened to base plate 706 or the ground.

Figure 7C:
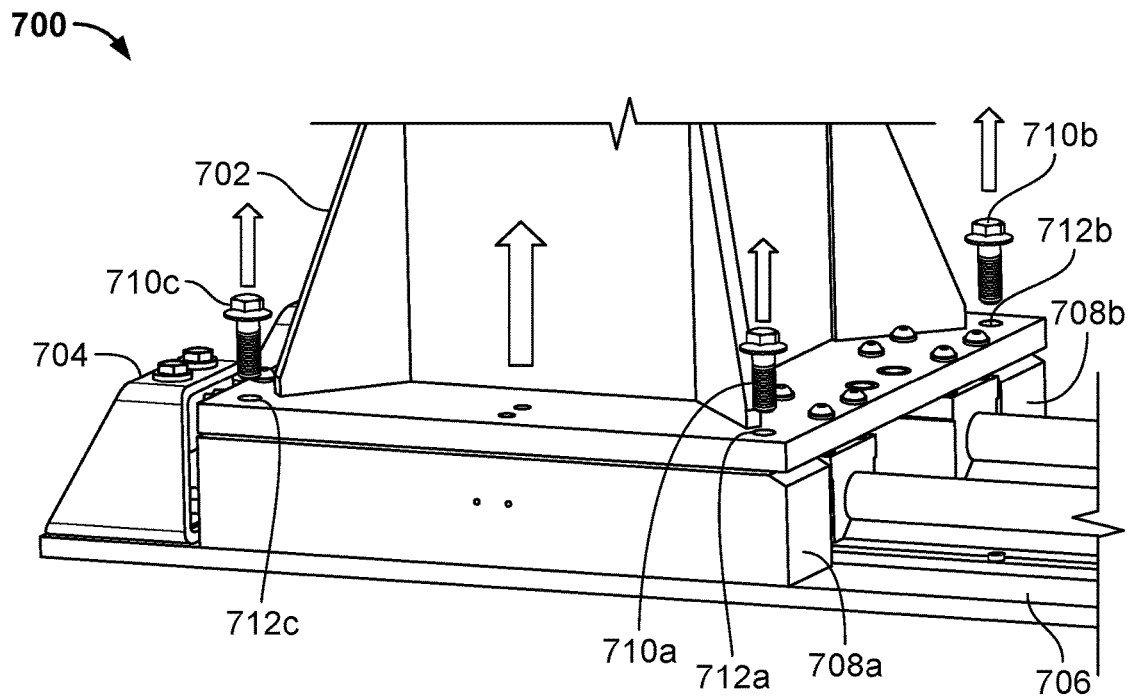
FIG. 7C is a diagram of a repositionable riser system according to various embodiments.

FIG. 7C is a diagram of a repositionable riser system according to various embodiments. In the example illustrated in FIG. 7C, repositionable riser 700 may automatically generate a clearance between riser 702 and the anchor structure such as anchor block 708a and anchor block 708b.

According to various embodiments, the clearance between riser 702 and the anchor structure such as anchor block 708a and anchor block 708b is automatically generated in response to a loosening and/or removal of the one or more anchoring fasteners with which riser 702 is coupled to the anchor structure. In some embodiments, when the anchoring bolts are removed from the repositionable riser 700 (e.g., from the riser 702 and anchor structure), the bearing springs (e.g., springs in the lateral translation subsystem such as a carriage) raise the riser 702 up, creating clearance between the riser 702 and anchor block 708a and anchor block 708b.

As illustrated in FIG. 7C, anchoring fastener 710a is removed from hole 712a, anchoring fastener 710b is removed from hole 712b, and anchoring fastener 710c is removed from hole 712c.

Figure 7D:
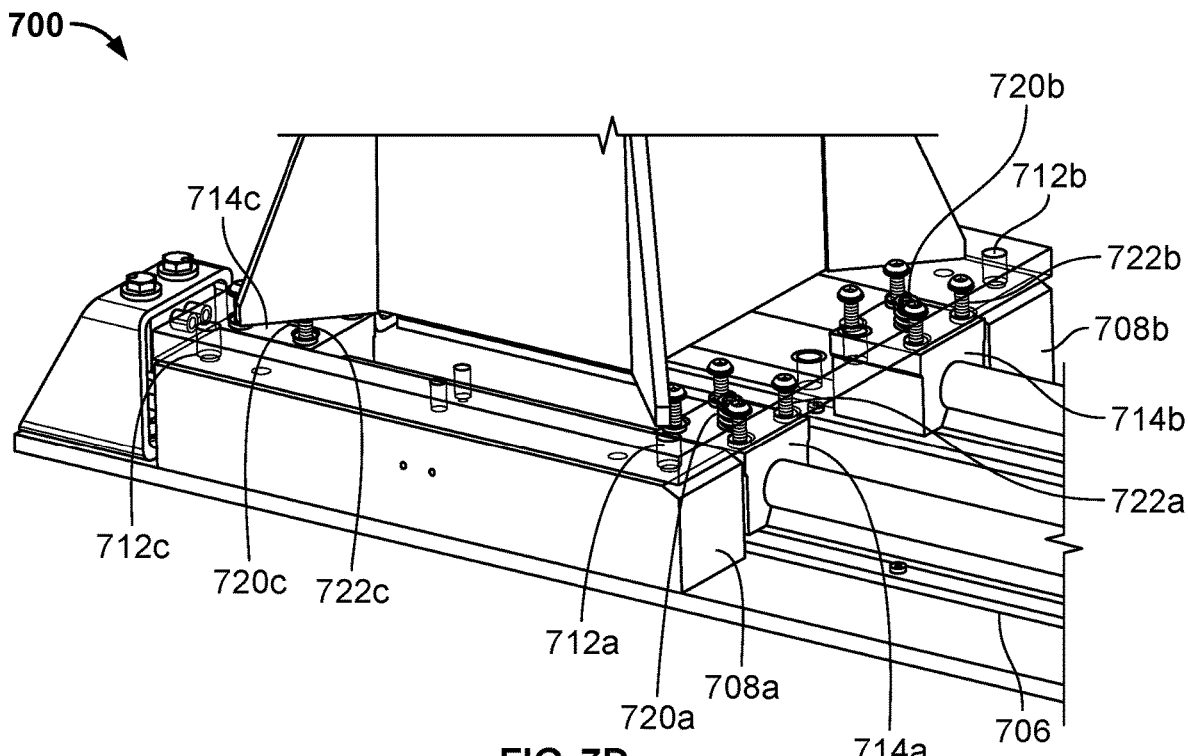
FIG. 7D is a diagram of a repositionable riser system according to various embodiments.

FIG. 7D is a diagram of a repositionable riser system according to various embodiments. In the example illustrated in FIG. 7D, repositionable riser 700 may automatically generate a clearance between riser 702 and the anchor structure such as anchor block 708a and anchor block 708b.

According to various embodiments, the clearance between riser 702 and the anchor structure such as anchor block 708a and anchor block 708b is automatically generated in response to a loosening and/or removal of the one or more anchoring fasteners with which riser 702 is coupled to the anchor structure. In some embodiments, when the anchoring bolts are removed from the repositionable riser 700 (e.g., from the riser 702 and anchor structure), the bearing springs (e.g., springs in the lateral translation subsystem such as a carriage) raise the riser 702 up, creating clearance between the riser 702 and anchor block 708a and anchor block 708b.

According to various embodiments, the clearance between riser 702 and the anchor structure is automatically generated in response to a loosening and/or removal of the one or more anchoring fasteners with which riser 702 is coupled to the anchor structure. The clearance may be generated by one or more biasing elements. In some embodiments, the one or more biasing elements comprise one or more bearing springs. As an example, the one or more bearing springs may be comprised in the carriage (e.g. the carriage that traverses the constrained lateral path between the first end 704 and the second end). According to various embodiments, the carriage comprises one or more rail bearings that are respectively disposed on at least one of the one or more elongated structures that define a constrained lateral path along which the carriage is movable. As illustrated in FIG. 7D, repositionable riser 700 comprises rail bearing 714a and 714b. The one or more rail bearings may respectively comprise one or more biasing elements. As illustrated in FIG. 7D, rail bearing 714a comprises bearing spring 720a and rail bearing 714b comprises bearing spring 720b. The one or more bearing springs 720a, 720b, and 720c may be biased to apply a force to the riser 702 in a vertical direction to provide clearance between a top surface of anchor blocks 708a and 708b, and one or both of riser 702 and the carriage.

According to various embodiments, the carriage may comprise one or more elements to limit the height of the riser (e.g., a height of the clearance created between the riser or carriage and the anchor structure). For example, one or more rail bearings comprised in the carriage may respectively comprise one or more height limiting elements. The height limiting elements may comprise a height limiting fastener. As illustrated in FIG. 7D, rail bearing 714a comprises one or more height limiting fasteners such as height limiting fastener 722a, rail bearing 714b comprises one or more height limiting fasteners such as height limiting fastener 722b, and/or rail bearing 714c comprises one or more height limiting fasteners such as height limiting fastener 722c.

Figure 7E:
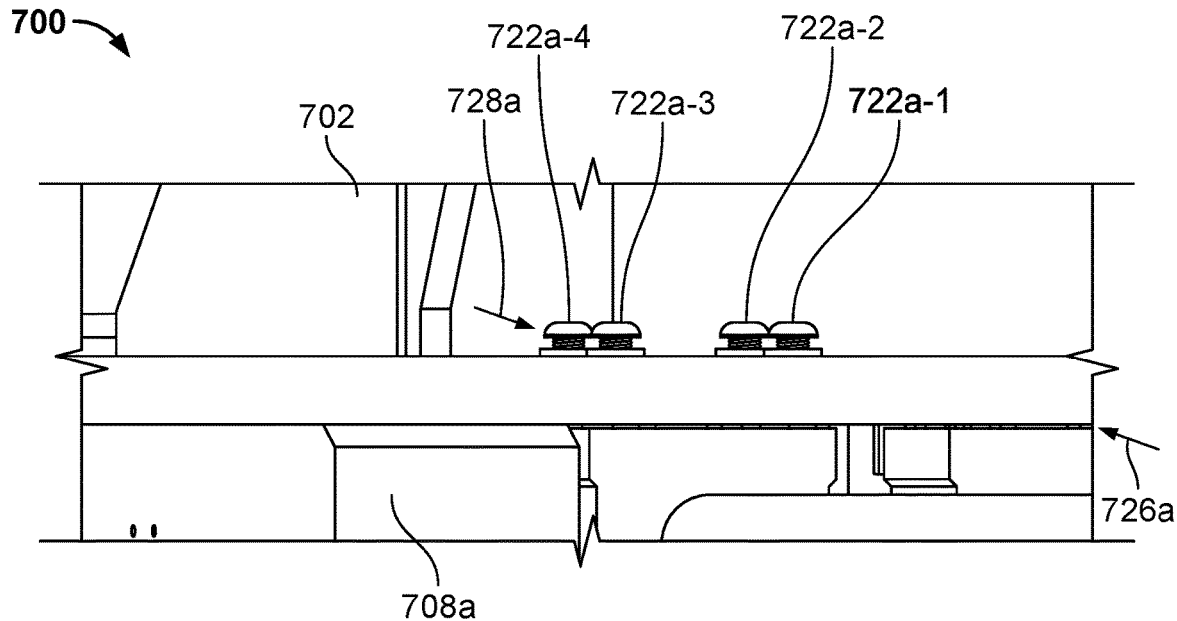
FIG. 7E is a diagram of a repositionable riser system according to various embodiments.
Figure 7F:
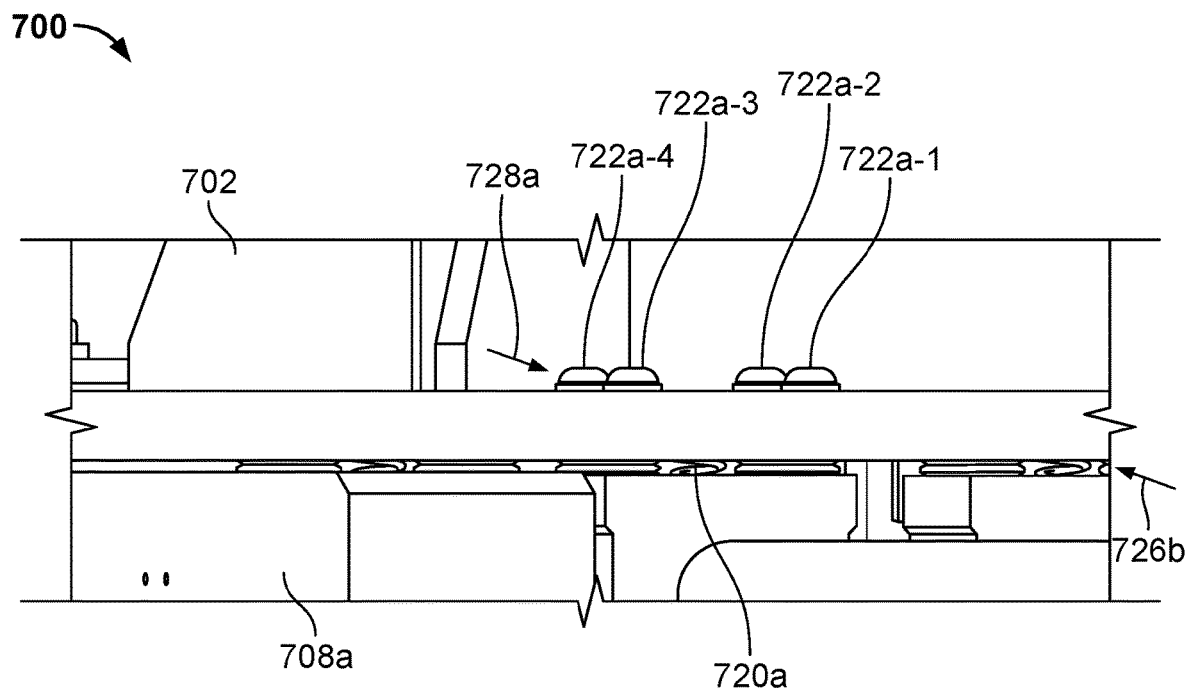
FIG. 7F is a diagram of a repositionable riser system according to various embodiments.

FIG. 7E is a diagram of a repositionable riser system according to various embodiments. FIG. 7F is a diagram of a repositionable riser system according to various embodiments. According to various embodiments, to limit the amount the bearing springs raise the riser, one or more height limiting elements (e.g., a height limiting fastener) restrict the maximum size of the gap (e.g., the clearance between the riser and the anchor structure). As illustrated in FIG. 7E, the anchor fasteners (e.g., anchor bolts) between the riser 702 and the anchor structure such as anchor block 708a are secured (not shown) and the gap 728a defining to which the height limiting fasteners (e.g., height limiting fasteners 722a-1, 722a-2, 722a-3, and 722a-4) are set to limit is visible. Conversely, a gap 726a between the riser 702 and the rail bearings is very small (e.g., the gap is the height at which the bearing spring has been compressed and substantially equal to a difference in height between the top surface of the anchor blocks and a top surface of the rail bearings).

As illustrated in FIG. 7F, the anchor fasteners (e.g., anchor bolts) between the riser 702 and the anchor structure such as anchor block 708a have been removed and the bearing springs (e.g., bearing spring 720a, etc.) have lifted the riser 702 above the anchor blocks to the limited height to which the height limiting fasteners were set/configured. In the example illustrated in FIG. 7F, the gap 728a defining to which the height limiting fasteners are set to limit has been closed as the riser 708 has been lifted. Conversely, gap 726b between the riser 702 and the rail bearings has increased (e.g., equal to the amount of clearance of height limit).

Figure 7G:
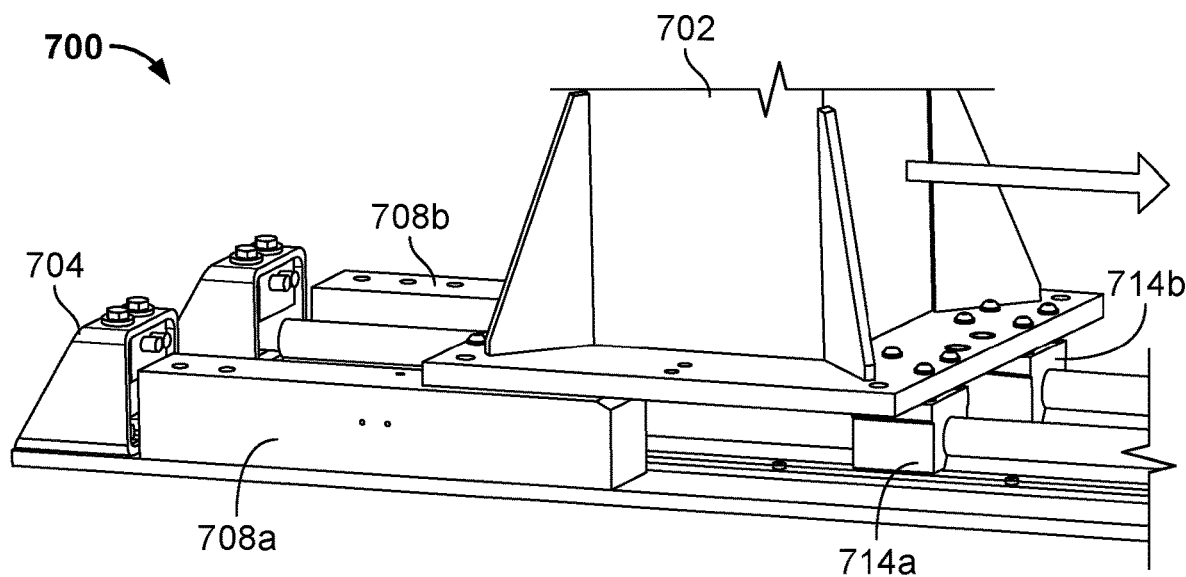
FIG. 7G is a diagram of a repositionable riser system according to various embodiments.

FIG. 7G is a diagram of a repositionable riser system according to various embodiments. As illustrated in FIG. 7G, when the riser 702 has been de-coupled or unfastened from the anchor structure (e.g., and clearance has been generated between one or both of the riser 702 and the carriage, and the anchor structure), riser 702 may be moved along the one or more elongated structures (e.g., along the constrained lateral path along which the carriage is movable). In some embodiments, clearance between riser 702 and the anchor block 708a and anchor block 708b eliminates frictional forces between riser 702 and the anchor block 708a and anchor block 708b, and allow riser 702, now supported by the carriage (e.g., rail bearings such as rail bearing 714a and rail bearing 714b), to be moved with minimal effort.

Figure 7H:
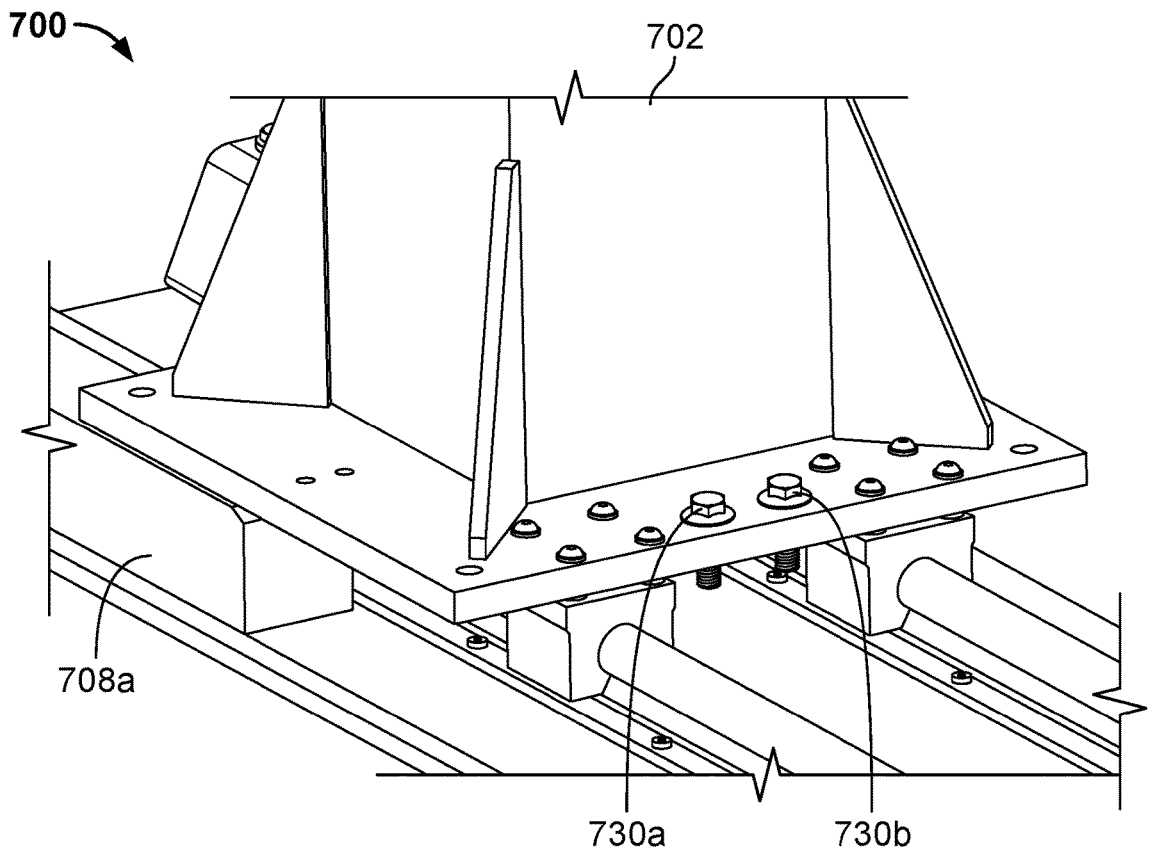
FIG. 7H is a diagram of a repositionable riser system according to various embodiments.

FIG. 7H is a diagram of a repositionable riser system according to various embodiments. As illustrated in FIG. 7H, repositionable riser 700 may comprise a mechanism by which components may be temporarily stored in order to avoid loss or misplacement of the components. In some embodiments, anchoring fasteners are removed from the holes in the riser 702 and anchor structure in order to move the riser 702 to the second end 754. Various embodiments include a mechanism to hold the anchoring fasteners when riser 702 is not coupled to the anchor structure.

In some embodiments, the mechanism to hold the anchoring fasteners comprises one or more holes in the riser 702 or carriage. As illustrated in FIG. 7H, holes 730a and 730b in the base of the riser 702 act as storage for the anchoring fasteners (e.g., used to secure the riser to the anchor blocks such as via the holes at the corners of the riser base, when the riser 702 is in the robotic operation position).

Figure 7I:
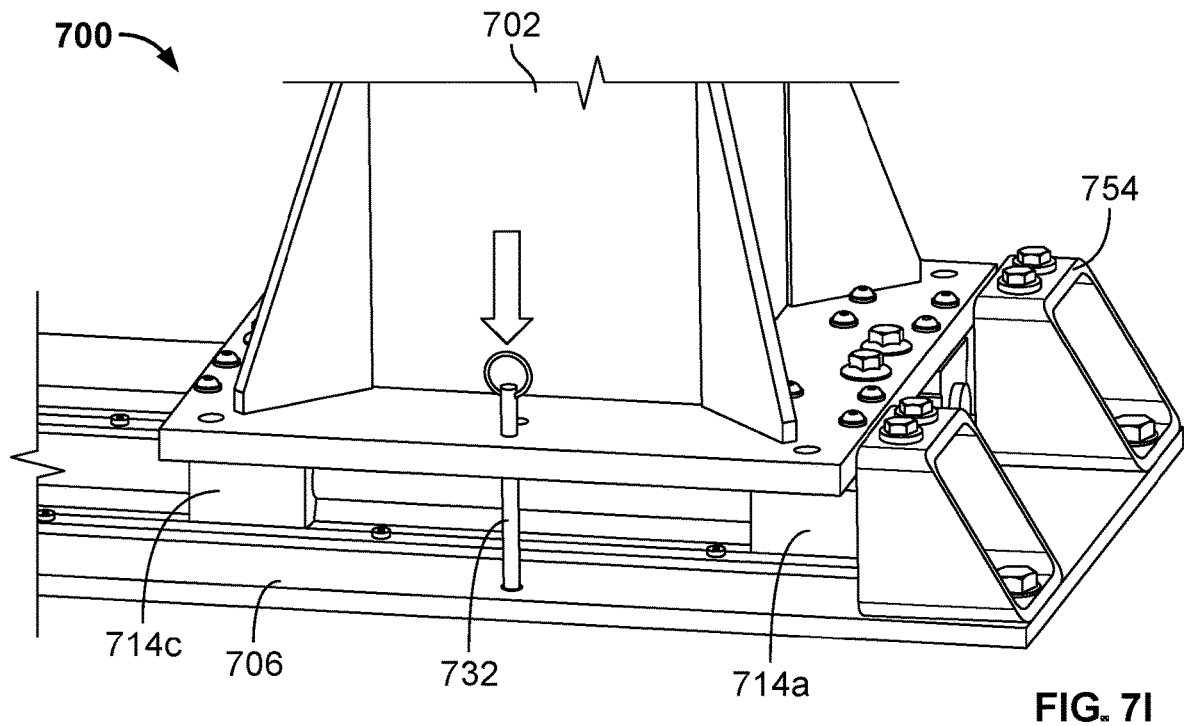
FIG. 7I is a diagram of a repositionable riser system according to various embodiments.

FIG. 7I is a diagram of a repositionable riser system according to various embodiments. According to various embodiments, repositionable riser 700 may comprise a mechanism to lock the riser 702 at the second end (e.g., the inactive position). The lock may be a temporary lock that provides for a quick release of the riser 702.

Because the equipment mounted to riser 702 is not operating in the inactive position, the locking mechanism of the riser 702 at the second end does not need to be as robust as the mechanism for coupling/fastening the riser to the anchor structure in the active position. As illustrated in FIG.

7H, repositionable riser 700 may comprise a pin 732. Pin 732 may be inserted into a through hole in the base of riser 702 and engage base plate 706 such as via a hole in the base plate 706. In some embodiments, the pin 732 is coupled the riser to the ground (e.g., the pin 732 may be inserted into a through hole in the base of riser 702 and engage the ground).

Figure 8A:
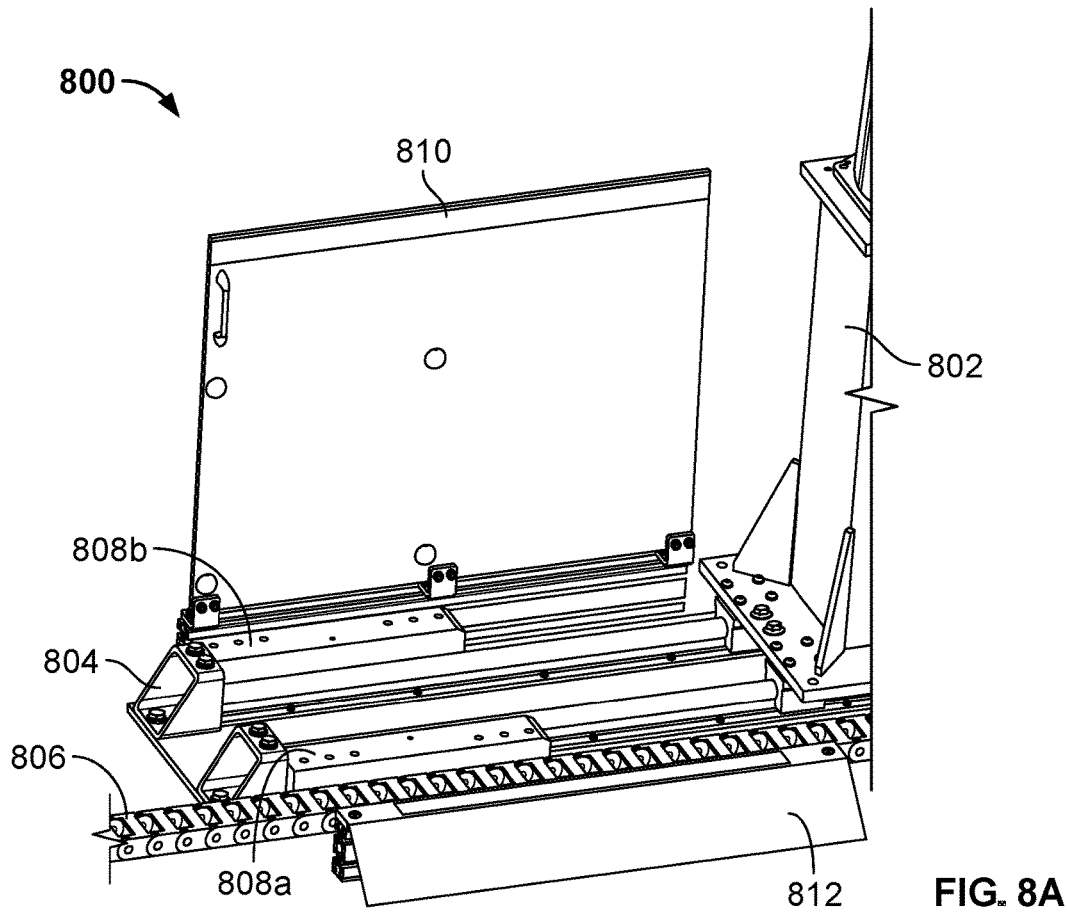
FIG. 8A is a diagram of a repositionable riser system according to various embodiments.

FIG. 8A is a diagram of a repositionable riser system according to various embodiments. As illustrated in FIG. 8A, repositionable riser 800 may comprise a repositionable cover such as step cover 810. In some embodiments, the repositionable cover may protect various parts of repositionable riser 800 at first end 804 when riser 802 is moved away from the first end (e.g., moved from the active position). In the example in FIG. 8A, the step cover 810 is illustrated in an open position.

According to various embodiments, the repositionable riser 800 may include a cover (e.g., a step cover 810) disposed at the first end 804. The step cover 810 may provide protection of various components comprised in the repositionable riser 804 in the event that a human operator is present/working at the first end 804 (e.g., while robot is in the inactive position the second end). The step cover 810 may be configured/arranged such that when the step cover is engaged it protects at least one of the one or more anchor blocks (e.g., anchor block 808a and anchor block 808b), the one or more structures (e.g., the rails, guides, channels, etc. along which the riser/carriage traverses), and/or one or more cables or hoses that connect to the robot to provide the robot with connection to various sources such as power, network communications, and/or fluids (e.g., compressed air for pneumatic control of an element of the robot such as a suction-based end effector). As an example, the one or more cables or hoses may be comprised in (or partially encased) by cable or hose tracker 806. The step cover 810 may cover and protect cable or hose tracker 806 when step cover 810 is engaged (e.g., in a closed position). The cover may provide safety protection for the human operator. For example, the cover may prevent a human operator from inadvertently falling or tripping over various components of the repositionable riser. In some cases, a human operator may stand at the first end (e.g., in the active position) to manually perform one or more tasks that the robot would perform at the first end (e.g., to manually perform a singulation, kitting, or palletization/de-palletization). For example, if a plan or strategy being implemented by the robot is unsuccessful and/or the robot is unable to determine a plan or strategy for performing a task (e.g., moving the item), the human operator may be notified, and the human operator may come to the workspace to manually perform the task and/or train the robot. In some cases, a human operator may stand at the first end to remediate the robotic system (e.g., to replace an inoperable or broken end effector, to remove a blockage in the system, etc.). Accordingly, in those cases that the human operator is within the workspace (e.g., at the active position), operator safety is improved with the engagement of the cover. The step cover 810 may comprise a handle with which a human operator may engage/position the step cover 810. In some embodiments, step cover 810 comprises one or more bumpers on a side/surface of the step cover 810 that may engage one or more parts of the repositionable riser 800 when the step cover 810 is in a closed position. The bumpers may comprise rubber or other soft and/or protective material.

As illustrated in FIG. 8A, the repositionable riser 800 comprises a step cover incline side 812 that forms with step cover 810 an enclosure of various parts repositionable riser 800 when step cover 810 is closed.

Figure 8B:
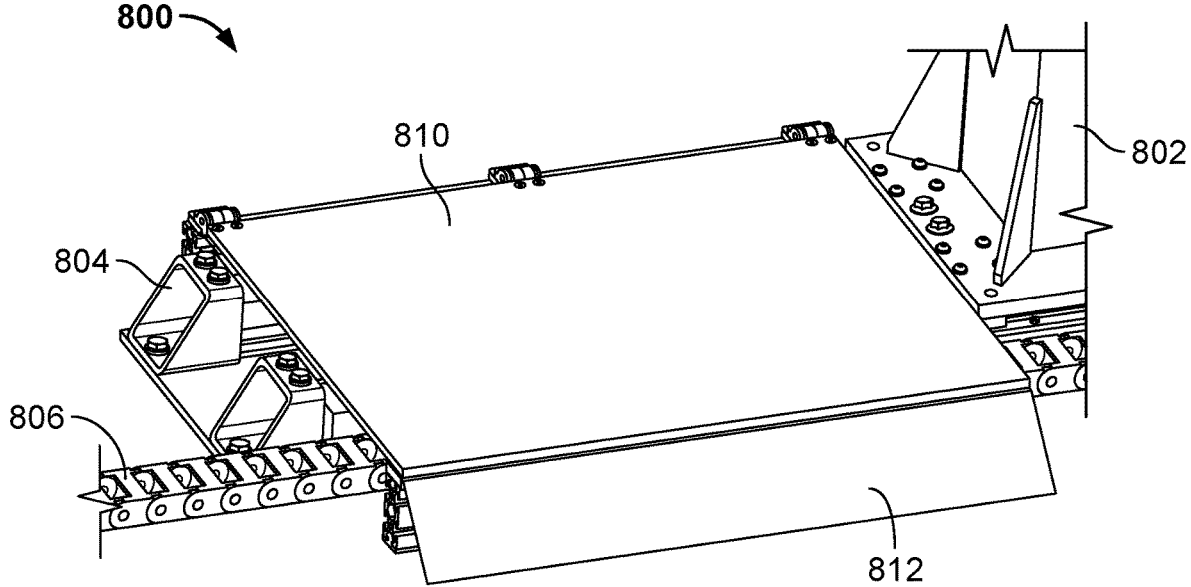
FIG. 8B is a diagram of a repositionable riser system according to various embodiments.

FIG. 8B is a diagram of a repositionable riser system according to various embodiments. In the example illustrated in FIG. 8B, step cover 810 is positioned in a closed position. Step cover 810 and step cover incline side 812 provides support for a human operator as the human operator is working within the workspace (e.g., the first end). In some embodiments, the step cover 810 and step cover incline side 812 are configured to be sufficiently robust to withstand the weight of a human operator. While the riser 802 is in the inactive position, a step cover 810 is placed over the rails, allowing someone to use the space that was previously occupied by the robot.

Figure 9:
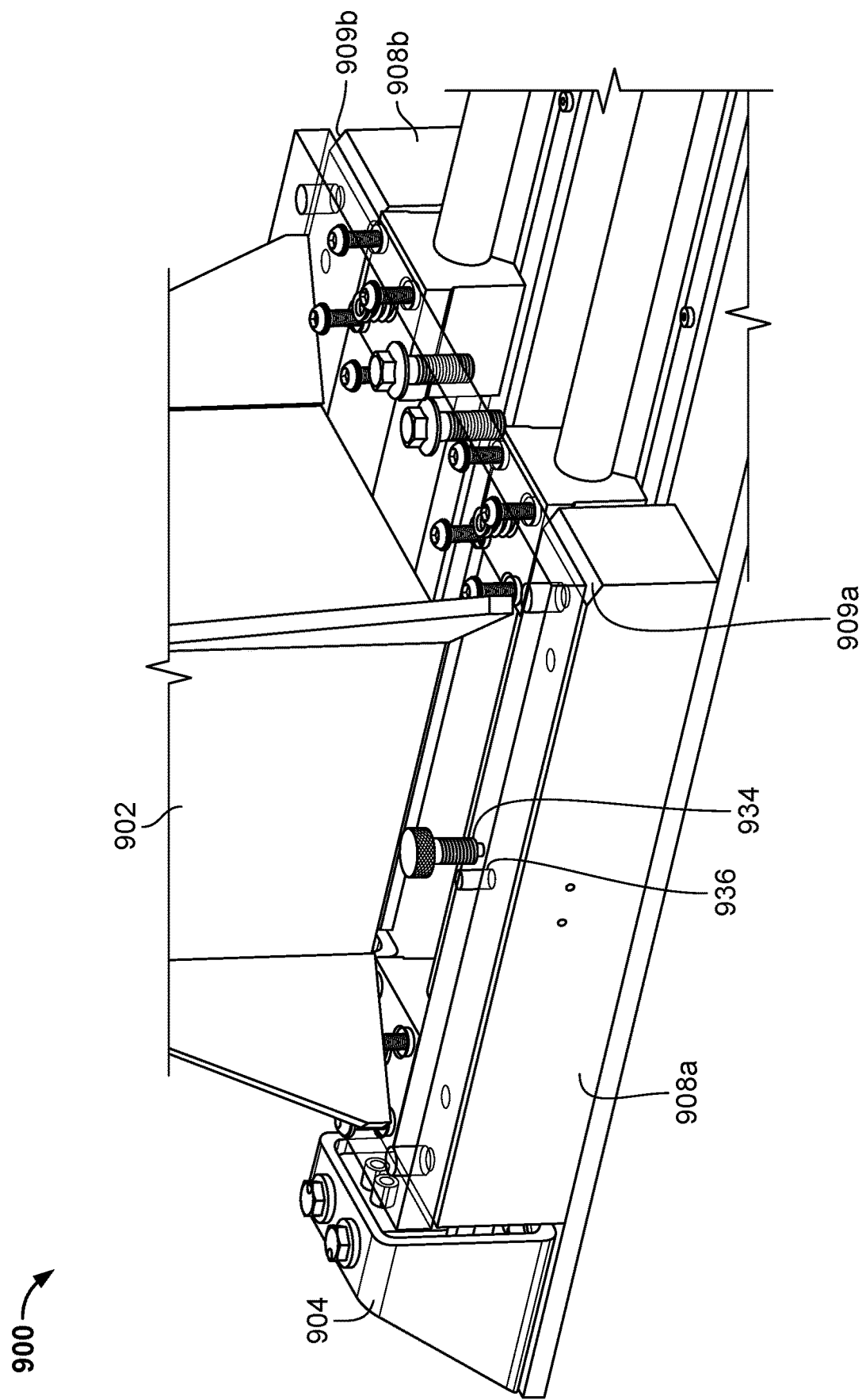
FIG. 9 is a diagram of a repositionable riser system according to various embodiments.

FIG. 9 is a diagram of a repositionable riser system according to various embodiments. In some embodiment, the repositionable riser may comprise a locating pin mechanism that quickly identifies the active position. The locating pin may be aligned with a corresponding hole in the anchor structure or other reference point on the repositionable riser, where the hole or reference point is configured to correspond to the active position.

According to various embodiments, repositionable riser 900 comprises one or more locating pins such as locating pin 934. The locating pin 934 may be used in connection with determining that riser 902 and/or the carriage on which riser 902 is mounted is in the active position. For example, the locating pin 934 may extend through a hole in base of riser 902, and may engage with a hole 936 disposed at the first end 904 of the repositionable riser 900. In some embodiments, the hole 936 with which the locating pin 934 engages when the riser 902 is in the active position is comprised in an anchor structure (e.g., one or more anchor blocks such as anchor block 908a or 908b). Repositionable riser 900 may comprise a plurality of locating mechanisms/pins. In response to determining that the locating pin 934 has engaged the corresponding hole 936 at the first end 904, a human operator may manually couple riser 902 at the first end 904 (e.g., to an anchor structure of repositionable riser 900). For example, the human operator may couple riser 902 with one or more screws, bolts, or cam levers, or any combination thereof. Various other devices for coupling the riser 902 to the first end 904 may be implemented. In some embodiments, a locating pin may be comprised in the carriage (e.g., the carriage to which riser 902 is mounted) and the hole with which the locating pin engages at the active position may be comprised in an anchor structure or in the translational subsystem (e.g., the one or more structures such as rails, guides, etc.). In some embodiments, the hole with which a locating pin engages at the active position may be comprised in a base plate of the repositionable riser 900. In some embodiments, to prevent the locating pin from restricting the carriage or riser 902 from proceeding to the first end 904, an anchor structure or other structure (e.g., anchor block 908a and anchor block 908b) that may be in the path of the locating pin 934 has a chamfer or profile (e.g., to allow the locating pin to follow, or move according to, the profile of the anchor structure or other structure within its path until the pin engages the corresponding hole at the active position). As illustrated in FIG. 9, anchor block 908a includes chamfer 909a and anchor block 908b includes chamfer 909b. Engagement of the locating pin 934 with the corresponding hole 936 at the active position may allow the riser 902 to be loosely or temporarily held in place at the active position while the riser 902 is more securely coupled/mounted at the at the active position (e.g., while a human operator bolts the riser 902 to the anchor structure).

When being moved to the active position, the chamfer feature in the anchor block (e.g., chamfer 909 of anchor block 908a) pushes the spring-loaded locating pin up onto the top surface of the anchor block. When the riser 902 is in the correct position, the locating pin locks into a hole 936 in the anchor block, thereby constraining the riser 902.

Figure 10A:
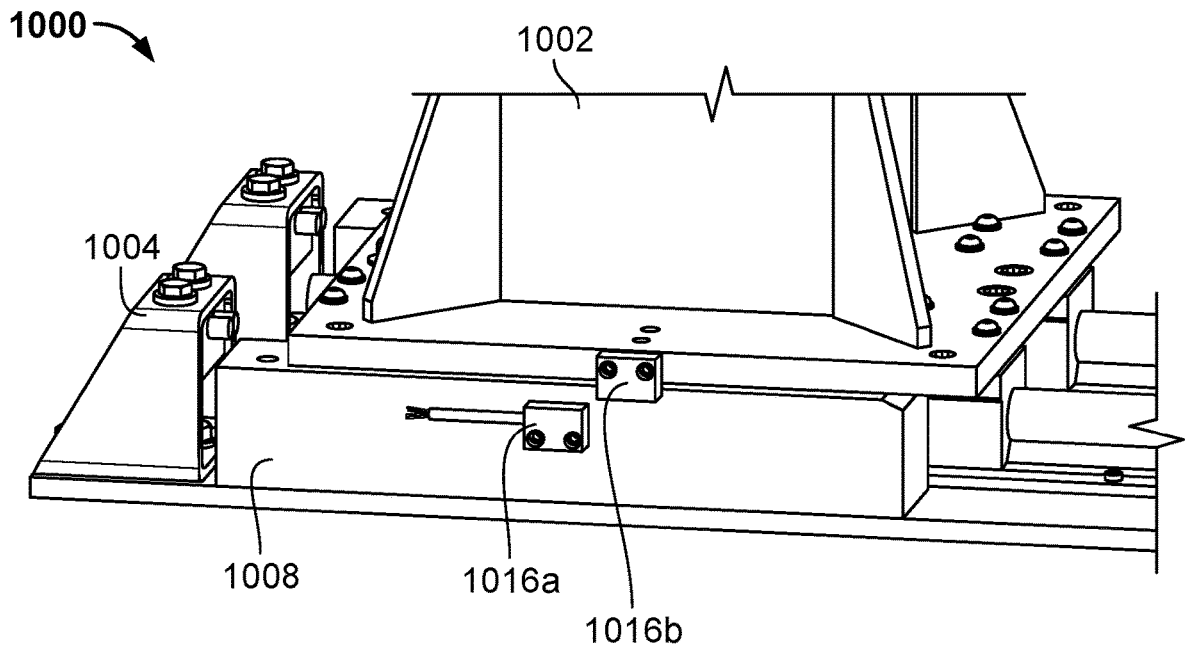
FIG. 10A is a diagram of a repositionable riser system according to various embodiments.
Figure 10B:
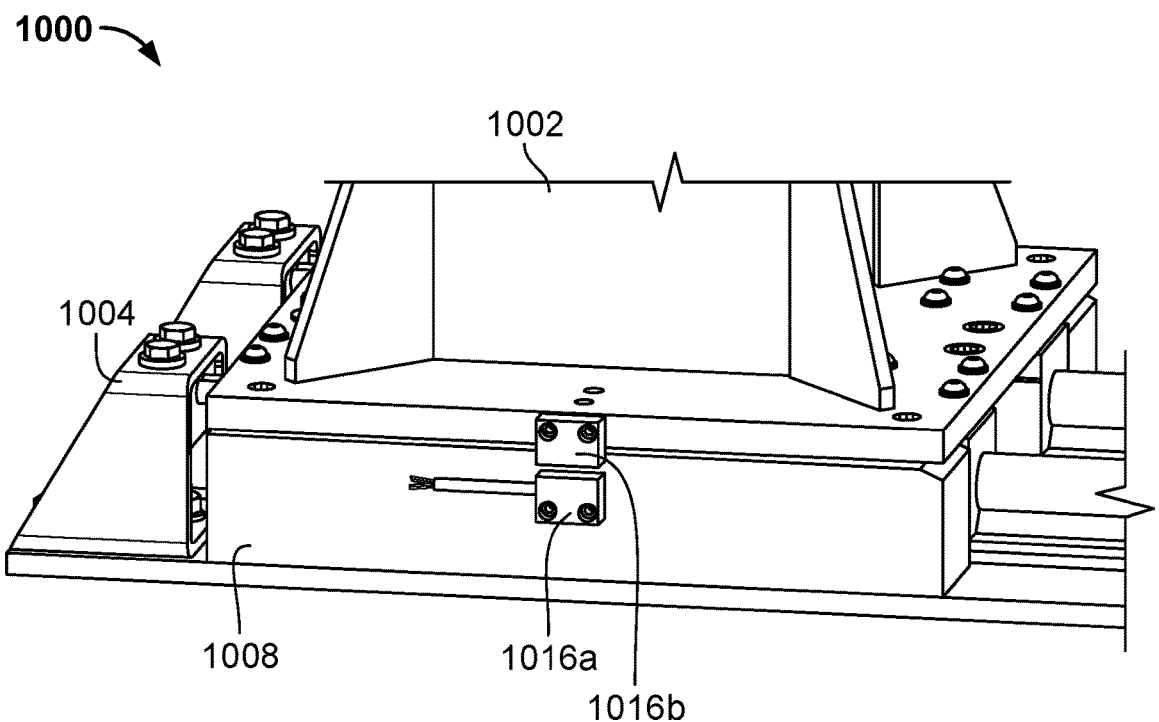
FIG. 10B is a diagram of a repositionable riser system according to various embodiments.

FIG. 10A is a diagram of a repositionable riser system according to various embodiments. In the example illustrated in FIG. 10A, a safety switch or sensor 1016a and 1016b is in (or is indicative) of an open position (e.g., a position deemed unsafe). FIG. 10B is a diagram of a repositionable riser system according to various embodiments. In the example illustrated in FIG. 10B, a safety switch or sensor is in (or is indicative) of a closed position (e.g., a positioned deemed safe). The open position may correspond to an unsafe position because the riser 1002 is not in the active position of first end 1004 at which the riser 1002 is securely coupled to the anchor structure such as anchor block 1008. Because the riser 1002 is not in position to be securely coupled, operation of the robot mounted to riser 1002 may generate dynamic forces that cause an instability in the robot or riser 1002 and may move riser 1002 in an uncontrolled manner. In addition, if the robot were to be so operated in a position other than the active position, the sensors and computer system that controls the robots according to sensor information and relative location of various components in the workspace may be uncalibrated.

The sensors 1016a and/or 1016b may be safety sensors that are configured to detect whether riser 902 is securely positioned in an active position. In some embodiments, the safety sensor(s) may be disposed on or within an anchor structure and/or the riser 1002. For example, as illustrated in FIG. 10A and FIG. 10B, a sensor pair used to detect whether riser 1002 is securely positioned in an active position comprises a sensor 1016a disposed on an anchor structure and a sensor 1016b disposed on a base of riser 1002. In some embodiments, one or more sensors (e.g., a safety sensor) is comprised in the lateral translation subsystem. As an example, the carriage may comprise a sensor that may be used to determine whether the carriage is at the first end (e.g., that riser 1002 is in the active position). As another example, the base or one or more structures may comprise a sensor that is may be used to determine whether the carriage is at the first end. The one or more sensors (e.g., safety sensor(s)) may comprise a camera (e.g., a 3D camera), an infrared sensor array, a laser array, a scale, a gyroscope, a current sensor, a voltage sensor, a power sensor, a force sensor, a pressure sensor, a weight sensor, and the like. Various other sensors may be used in connection with determining a location of the robot/riser 1002 and/or determining whether the robot/riser 1002 is in the active position.

In some embodiments, a control computer that controls operation of the robot may control the robot to not operate when a safety switch or sensor 1016a and 1016b is in (or is indicative) of an open position (e.g., a position deemed unsafe). In response to determining that the safety switch or sensor 1016a and 1016b is in (or is indicative) of a closed position (e.g., a position deemed safe), the control computer may control to operate the robot (or permit the robot to operate). If the control computer determines that the safety switch or sensor 1016a and 1016b is in (or is indicative) of an open position (e.g., a position deemed unsafe) while robot is operating (e.g., because of an insecure coupling of riser to the anchor structure), the control computer may control the robot to cease/pause operation of the robot.

Figure 11A:
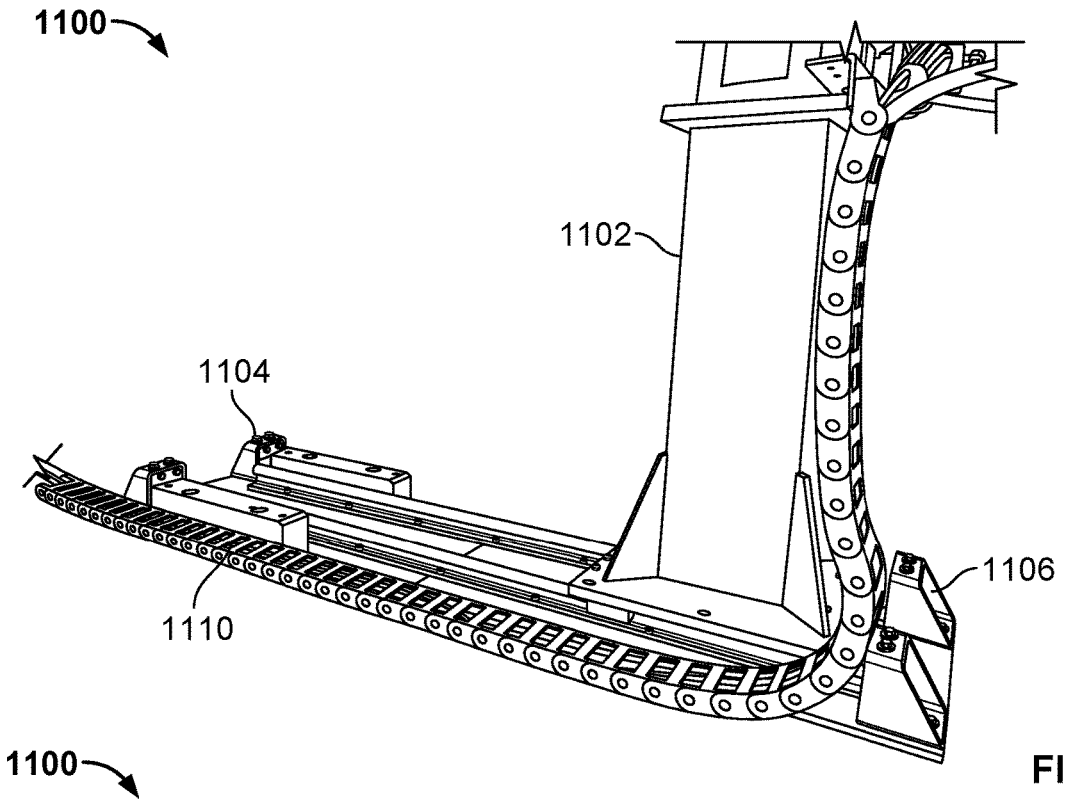
FIG. 11A is a diagram of a repositionable riser system according to various embodiments.
Figure 11B:
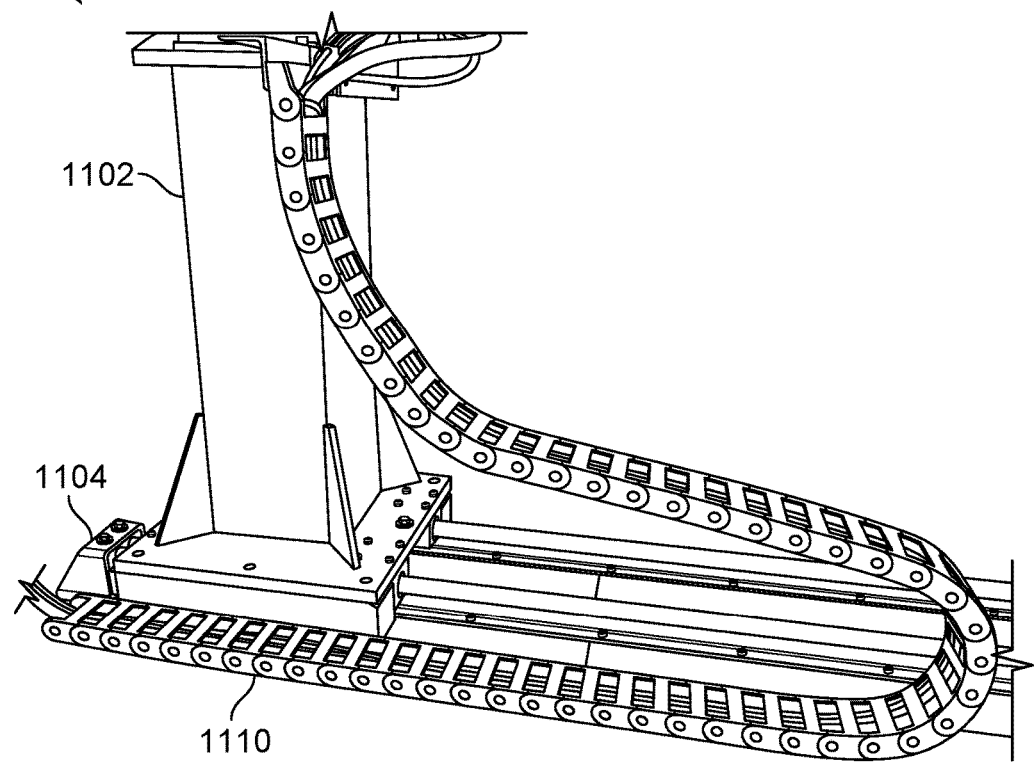
FIG. 11B is a diagram of a repositionable riser system according to various embodiments.

FIG. 11A is a diagram of a repositionable riser system according to various embodiments. In the example illustrated in FIG. 11A, riser 1002 of repositionable riser 1100 is positioned at the second end 1106 (e.g., an inactive position). FIG. 11B is a diagram of a repositionable riser system according to various embodiments. In the example illustrated in FIG. 11B, riser 1002 of repositionable riser 1100 is positioned at the second end 1104 (e.g., an inactive position).

According to various embodiments, repositionable riser 1100 comprises a cable (e.g., a cable and/or hose) tracker that is mounted to the riser 1102 and houses all connections to the robot. The cable tacker houses and protects all connections when the riser 1102 is moved between the active position and the inactive positions.

In some embodiments, the repositionable riser 1100 comprises a cable or hose (or tube) tracker 1110. The cable or hose tracker 1110 may a first end that is mounted or coupled to riser 1102. Cable or hose tracker 1110 may at least partially encase one or more cables or hoses. In some embodiments, the one or more cables or hoses connect to the robot to provide the robot with connection to various sources such as power, network communications, and/or fluids (e.g., compressed air for pneumatic control of an element of the robot such as a suction-based end effector). In some embodiments, the cable or hose tracker avoids tangling or chafing of the one or more cables or hoses as the riser 1102 moves between the first end and the second end. As an example, cable or hose tracker 1110 may be configured to maintain at least partial encasement of the one or more cables or hoses as the robot traverses between the first end 1104 and the second end 1106. As another example, the cable or hose tracker 1110 may maintain organization of the cable or hose tracker 1110 as the robot moves along the path defined by the one or more elongated structures 1108. The cable or hose tracker 1110 may be flexible. In some embodiments, the cable or hose tracker 1110 comprises one or more joints or pivot points. For example, as illustrated in FIGS. 11A and 11B, cable or hose tracker 1110 conforms to the path constrained lateral path along which the carriage is movable and/or the positioning of the riser 1102 relative to the one or more elongated structures. The cable or hose tracker 1110 may comprise a flexible conduit made up of links joined at bendable joints, to avoid damaging cables or pinching pneumatic air tubes.

Figure 12A:
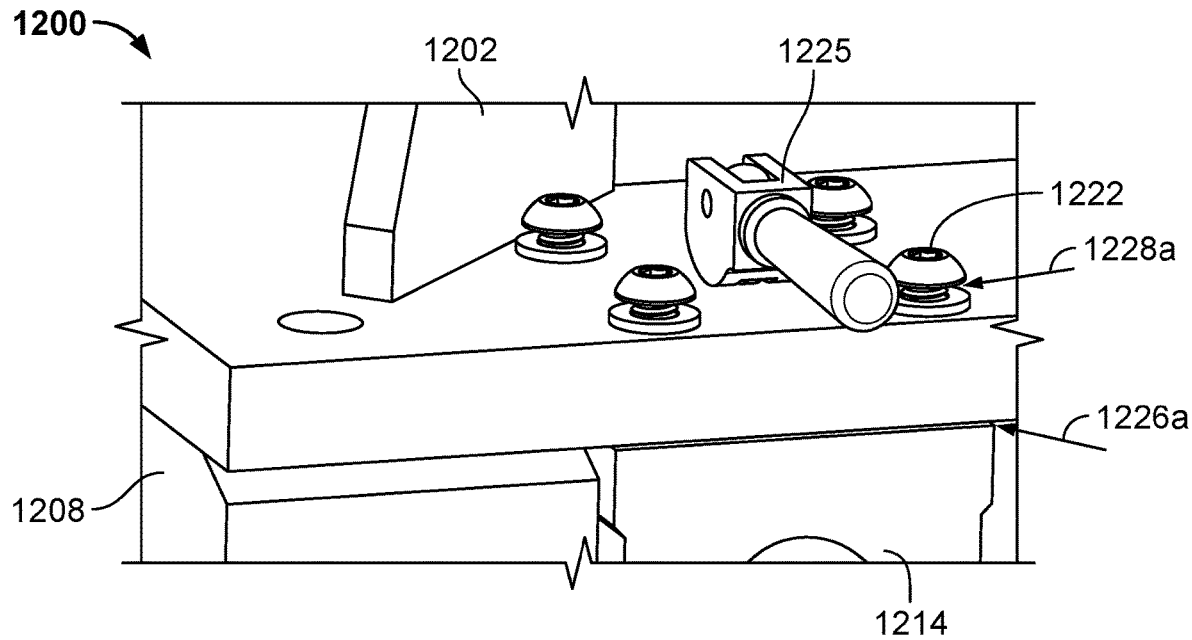
FIG. 12A is a diagram of a repositionable riser system according to various embodiments.

FIG. 12A is a diagram of a repositionable riser system according to various embodiments. In the example illustrated in FIG. 12A, repositionable riser 1200 comprises a cam lever 1225 that is configured to raise a riser 1202 relative a corresponding anchor structure such as anchor block 1208 to provide clearance for riser 1202 to be moved from the active position. The cam lever 1225 may be controlled to engage/disengage the riser 1202 and corresponding anchor structure, or otherwise couple/decouple the riser 1202 and corresponding anchor structure.

Figure 12B:
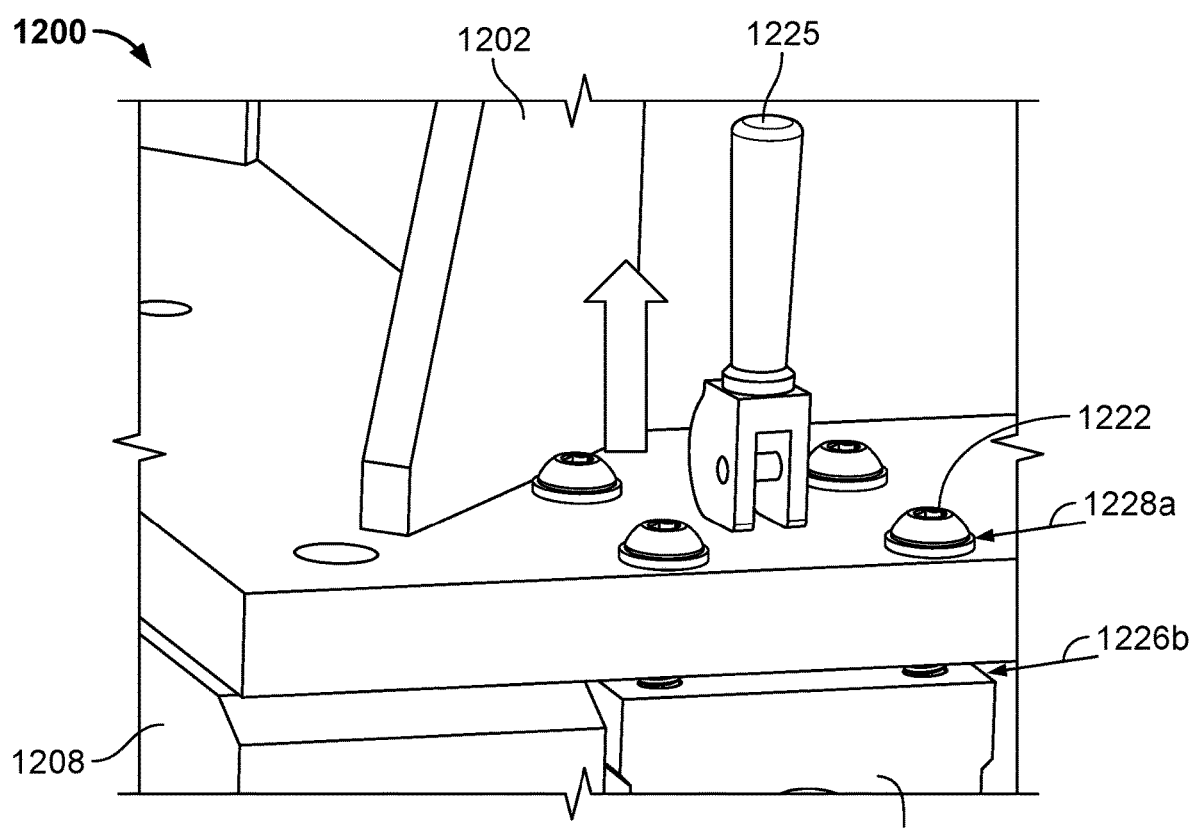
FIG. 12B is a diagram of a repositionable riser system according to various embodiments.

As illustrated in FIG. 12B, in the tightened position, cam lever 1225 anchors the riser 1202 to anchor structure such as anchor block 1208, which may eliminate the need for anchoring fasteners. Anchoring fasteners may be used to provide further secure fastening of the riser 1202 to the anchor structure.

FIG. 12B is a diagram of a repositionable riser system according to various embodiments.

As illustrated in FIG. 12B, cam lever 1225 pushes down on the rail bearings (e.g., rail bearing 1225), raising the riser 1202 above anchor block 1208. Gap 1226b illustrates the clearance between riser 1202 and the rail bearing, and gap 1228a illustrates that the height limiting fasteners (e.g., height limiting fastener 1222) has constrained the height at which the riser 1202 is raised.

According to various embodiments, the clearance between riser 1202 and the anchor structure such as anchor block 1208 is automatically generated in response to a loosening cam lever 1225. In some embodiments, when the cam lever 1225 is loosened (e.g., moved to a loosened position), the bearing springs (e.g., springs in the lateral translation subsystem such as a carriage) raise the riser 1202 up, creating clearance between the riser 1202 and anchor block 1208.

According to various embodiments, the clearance between riser 1202 and the anchor structure is automatically generated in response to a loosening cam lever 1225. The clearance may be generated by one or more biasing elements. In some embodiments, the one or more biasing elements comprise one or more bearing springs. As an example, the one or more bearing springs may be comprised in the carriage (e.g., the carriage that traverses the constrained lateral path between the first end 1204 and the second end). According to various embodiments, the carriage comprises one or more rail bearings that are respectively disposed on at least one of the one or more elongated structures that define a constrained lateral path along which the carriage is movable. One or more bearing springs may be biased to apply a force to the riser 1202 in a vertical direction to provide clearance between a top surface of anchor block 1208, and one or both of riser 1202 and the carriage.

According to various embodiments, the carriage may comprise one or more elements to limit the height of the riser (e.g., a height of the clearance created between the riser or carriage and the anchor structure). For example, one or more rail bearings comprised in the carriage may respectively comprise one or more height limiting elements. The height limiting elements may comprise a height limiting fastener. As illustrated in FIG. 12A, rail bearing 1214 comprises one or more height limiting fasteners such as height limiting fastener 1222.

According to various embodiments, to limit the amount the bearing springs raise the riser, one or more height limiting elements (e.g., a height limiting fastener) restrict the maximum size of the gap (e.g., the clearance between the riser and the anchor structure). As illustrated in FIG. 12A, the cam lever 1225 is engaged (e.g., tightened) and the gap 1228a defining to which the height limiting fasteners (e.g., height limiting fasteners 1222) are set to limit is visible. Conversely, a gap 1226 between the riser 1202 and the rail bearing 1214 is very small (e.g., the gap is the height at which the bearing spring has been compressed and substantially equal to a difference in height between the top surface of the anchor blocks and a top surface of the rail bearings).

As illustrated in FIG. 12B, the cam lever 1225 has been disengaged (e.g., loosened) and the bearing springs (e.g., bearing spring 720a, etc.) have lifted the riser 702 above the anchor blocks to the limited height to which the height limiting fasteners were set/configured. In the example illustrated in FIG. 12b, the gap 122a defining to which the height limiting fasteners are set to limit has been closed as the riser 1202 has been lifted. Conversely, gap 1226b between the riser 1202 and the rail bearings has increased (e.g., equal to the amount of clearance of height limit).

Figure 13A:
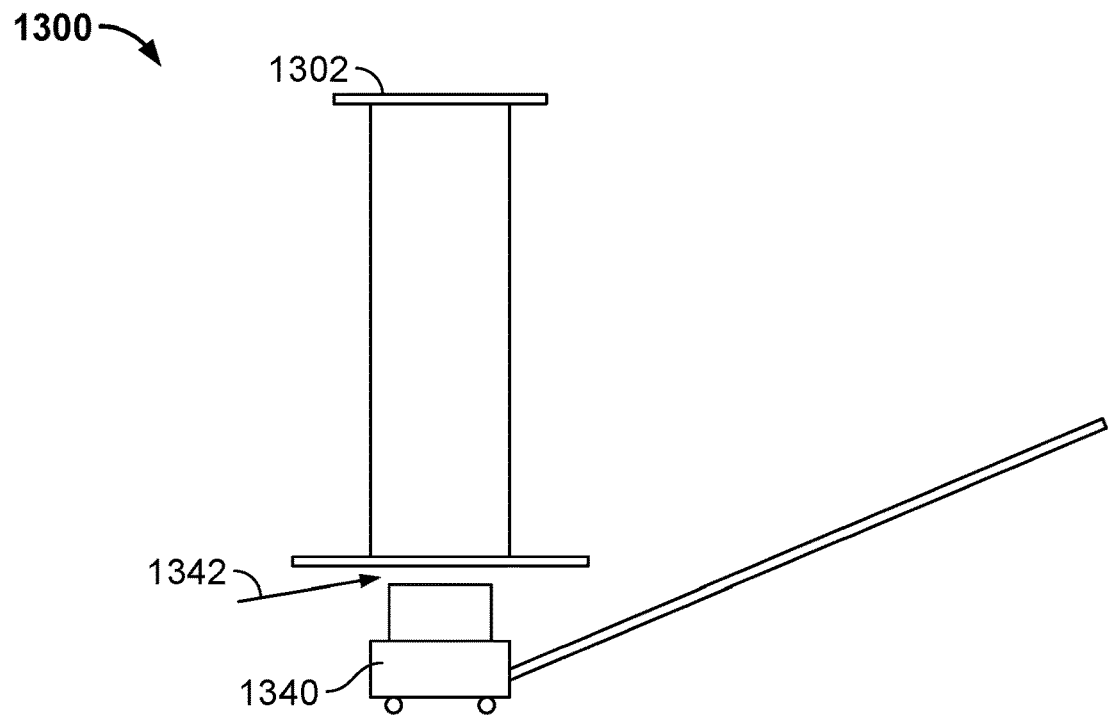
FIG. 13A is a diagram of a repositionable riser system according to various embodiments.

FIG. 13A is a diagram of a repositionable riser system according to various embodiments. In the example illustrated in FIG. 13A, repositionable riser 1300 comprises riser 1302 that may be raised using a jack mechanism. FIG. 13A illustrates the jack mechanism 1340 disengaged from riser 1302.

Figure 13B:
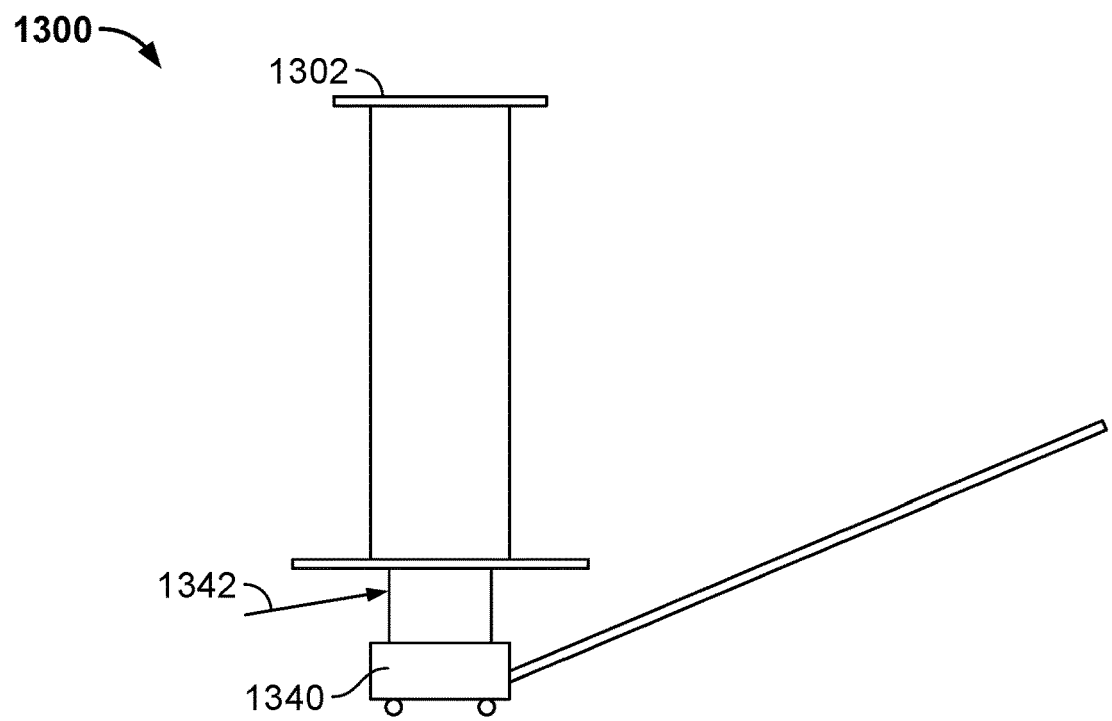
FIG. 13B is a diagram of a repositionable riser system according to various embodiments.

FIG. 13B is a diagram of a repositionable riser system according to various embodiments. In the example illustrated in FIG. 13B, repositionable riser 1300 comprises riser 1302 that may be raised using a jack mechanism. FIG. 13B illustrates the jack mechanism 1340 engaged from riser 1342.

According to various embodiments, the jack mechanism 1340 may include one or more of a mechanical cam, a mechanical screw, a scissor mechanism, a pneumatic system, a motor lift, etc. In some embodiments the jack mechanism 1340 comprises a carriage that carries the jack mechanism to/from the active position. As an example, the carriage may comprise wheels. As another example, the carriage may be disposed on or in one or more elongated structures such as rails, guides, channels, etc.

In some embodiments, the jack mechanism 1340 may be controlled to engage/disengage with riser 1302 to lift/lower riser 1303. As an example, the jack mechanism 1340 may be controlled by a human operator. As another example, the jack mechanism may be controlled by a control computer such as the control computer that controls the robotic system operating in the workspace (e.g., the computer system that controls the robot mounted to riser 1302).

The riser 1302 may rest and/or be mounted to an anchor structure when the riser 1302 is in the active position. When the riser 1302 is in the active position and the jack mechanism 1340 has not engaged the riser 1302, a clearance 1342 may exist between the riser 1302 and the jack mechanism 1340. In some embodiments, the jack mechanism 1340 may be freely moved to/from a position under the riser or a position at which the jack mechanism 1340 is to engage the riser 1302. When the riser 1302 is to be moved to the inactive position, the jack mechanism 1340 may be controlled to engage riser 1302 and to lift riser 1302. As illustrated in FIG. 13B, the clearance 1342 has closed when the jack mechanism 1340 has been controlled to lift riser 1302. When the jack mechanism 1340 engages riser 1302 to lift riser 1302, one or more anchoring fasteners, if any, may be removed to decouple the riser 1302 from the anchor structure.

Figure 14:
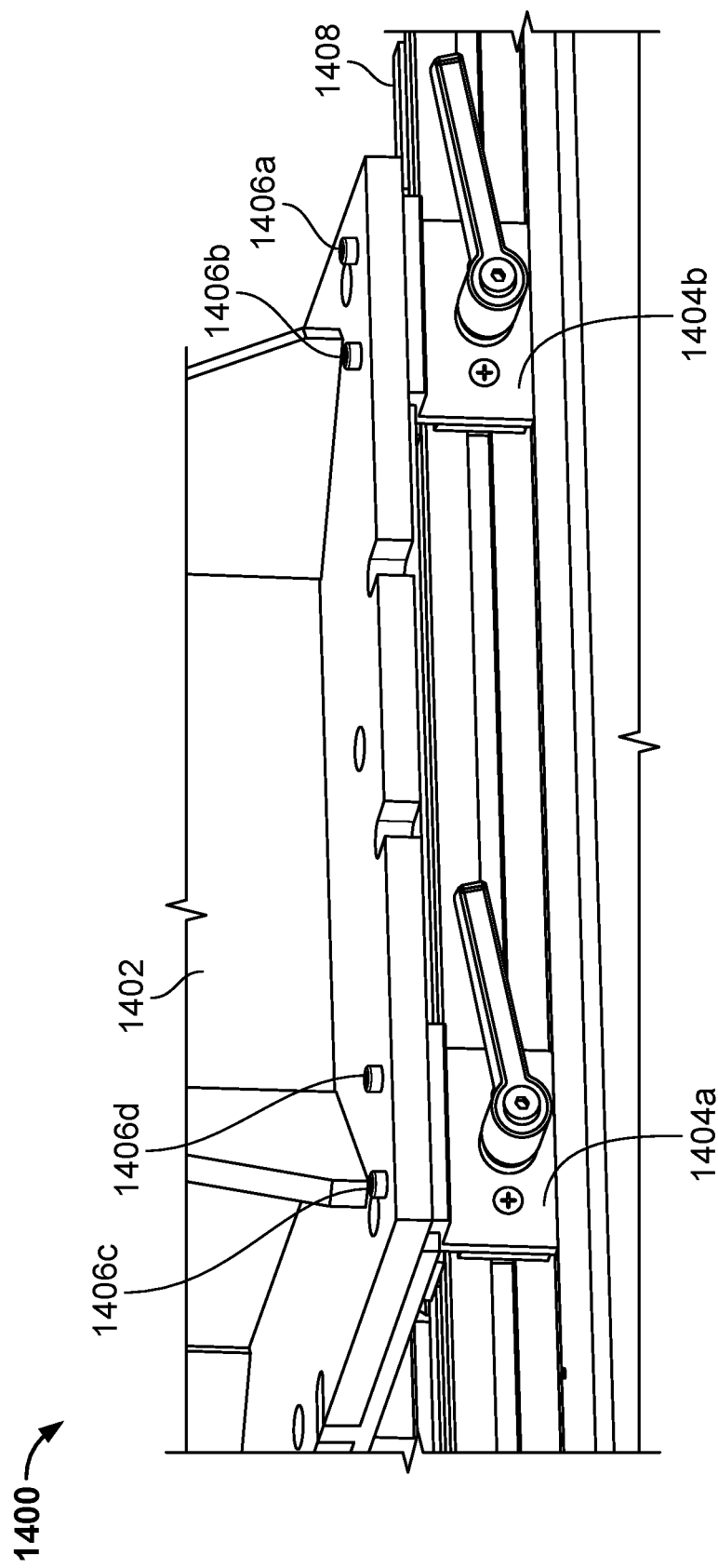
FIG. 14 is a diagram of a repositionable riser system according to various embodiments.

FIG. 14 is a diagram of a repositionable riser system according to various embodiments. In the example illustrated in FIG. 14, repositionable riser 1400 comprises riser 1402 that may be secured without the anchor fasteners (e.g., anchor bolts) that couple the riser to an anchor structure. In addition, riser 1402 that may be secured without an anchor block.

In some embodiments, riser 1402 may be secured to one or more low friction sleeve bearings 1404a and 1404b with corresponding hand brakes. The one or more low friction sleeve bearings may be mounted to a structure 1408 such as an extrusion. The structure may be a set of one or more rails, a set of one or more guides, a set of one or more channels, etc. Riser 1402 may be secured to one or more low friction sleeve bearings 1404a and 1404b using one or more anchor fasteners such as anchor fastener 1406a, anchor fastener 1406b, anchor fastener 1406c, and anchor fastener 1406d. In some embodiments, the hand brakes may be tightened to securely lock riser 1402 in position (e.g., securely lock riser in the active position in a manner that riser 1402 does not move during operation of the robot) and loosened to allow riser 1402 to slide along rails such as to an inactive position.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A repositionable riser, comprising:
a riser having one or more mounting locations at or near an upper end of the riser configured to fixedly mount an equipment on the riser;
a lateral translation subsystem comprising a carriage on which the riser is mounted and a set of one or more elongated structures that define a constrained lateral path along which the carriage is movable, the path including a first end associated with active use of the equipment and a second end not associated with active use of the equipment; and
an anchor structure to which one or both of the carriage and the riser are configured to be coupled to secure the riser at the first end, the anchor structure comprising:
one or more anchor blocks comprising one or more coupling holes via which one or both of the carriage and the riser is coupled with a fastener; and
one or more bearing springs that are configured to apply a biasing force against the riser in a direction perpendicular to the constrained lateral path along which the carriage is movable;
wherein:
the one or more bearing springs lift the riser off the one or more anchor blocks in response to removal of the fastener from the one or more holes in the anchor block.

2. The repositionable riser of claim 1, wherein the one or more mounting locations comprises a mounting plate.

3. The repositionable riser of claim 2, wherein the mounting plate includes threaded holes to fasten equipment.

4. The repositionable riser of claim 3, wherein the equipment comprises a robot.

5. The repositionable riser of claim 4, wherein the robot comprises a robotic arm, and the robotic arm has six degrees of freedom.

6. The repositionable riser of claim 1, wherein the set of one or more elongated structures that define the constrained lateral path along which the carriage is movable comprises: one or more rails on which the carriage traverses.

7. The repositionable riser of claim 6, wherein:
the carriage comprises a plurality of low friction rail bearings to slide along the one or more rails; and
the lateral translation subsystem allowing manual movement of the carriage along the one or more rails to an inactive position.

8. The repositionable riser of claim 1, wherein the set of one or more elongated structures that define the constrained lateral path along which the carriage is movable comprises: one or more channels via which the carriage traverses.

9. The repositionable riser of claim 1, wherein the set of one or more elongated structures that define the constrained lateral path along which the carriage is movable comprises: one or more guides via which the carriage traverses.

10. The repositionable riser of claim 1, further comprising:
a repositionable step cover, wherein when the repositionable step cover is disposed in a closed position, the repositionable step cover covers the anchor structure and a part of the lateral translation subsystem.

11. The repositionable riser of claim 1, further comprising:
a cable or hose tracker comprising a first end that is mounted to the riser, wherein;
a first end of the cable or hose tracker is mounted to the riser;
one or more cables or hoses are at least partially encased within the cable or hose tracker; and
the cable or hose tracker avoids tangling or chafing of the one or more cables or hoses as the riser moves between the first end and the second end.

12. The repositionable riser of claim 1, wherein:
the fastener comprises a tightening bolt; and
the one or more coupling holes comprise one or more threaded holes by which the riser is bolted in with the tightening bolt; and
the one or more anchor blocks comprise one or more threaded holes by which the riser is bolted in place.

13. The repositionable riser of claim 1, wherein:
the fastener comprises the one or more cam levers;
a tightening of the one or more cam levers causes the riser to engage at least one of the one or more anchor blocks; and
a loosening of the one or more cam levers causes the riser to disengage at least one of the one or more anchor blocks.

14. The repositionable riser of claim 1, wherein:
the one or more anchor blocks comprise at least one locating hole configured in at least one of the one or more anchor blocks;
the locating hole is configured to receive a locating pin when one or both of the carriage and riser is aligned with the one or more coupling holes of the anchor block;
the locating pin is not threaded into the hole and holds an anchor structure in place until one or both of the carriage and riser is coupled to at least one of the one or more anchor blocks via the one or more coupling holes.

15. The repositionable riser of claim 1, wherein a distance that the bearing spring moves the riser is limited by one or more height-limiting fasteners.

16. The repositionable riser of claim 15, wherein the distance that the bearing spring moves the one or more anchor blocks is sufficient to provide clearance between the riser and the one or more anchor blocks.

17. The repositionable riser of claim 1, wherein the lateral translation subsystem comprises one or more safety sensors that are configured to detect whether the riser is securely positioned in an active position.

18. The repositionable riser of claim 17, wherein the active position comprises the riser being positioned at first end, and the riser being substantially aligned with the anchor structure.

19. The repositionable riser of claim 1, wherein:
the lateral translation subsystem comprises one or more end stops disposed at the second end; and
the one or more stops prevent the carriage from being moved beyond the second end.

20. The repositionable riser of claim 19, wherein the lateral translation subsystem comprises a structure that is configured to, when engaged, to maintain the carriage at the second end and to prevent the carriage from moving towards the first end.

21. The repositionable riser of claim 20, wherein the structure that is configured to maintain the carriage at the second end comprises a pin structure.

* * * * *